(12) United States Patent
Suzuki et al.

(10) Patent No.: US 9,667,343 B2
(45) Date of Patent: May 30, 2017

(54) TRANSMISSION APPARATUS

(71) Applicant: FUJITSU LIMITED, Kawasaki-shi, Kanagawa (JP)

(72) Inventors: Kenji Suzuki, Sendai (JP); Tadashi Saitou, Shiogama (JP); Michiko Satou, Tagajou (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/923,218

(22) Filed: Oct. 26, 2015

(65) Prior Publication Data

US 2016/0156412 A1    Jun. 2, 2016

(30) Foreign Application Priority Data

Dec. 1, 2014 (JP) ................. 2014-243326

(51) Int. Cl.
*H04B 10/50* (2013.01)
*H04B 10/079* (2013.01)
*H04L 25/03* (2006.01)

(52) U.S. Cl.
CPC ..... *H04B 10/0795* (2013.01); *H04B 10/0799* (2013.01); *H04L 25/03057* (2013.01); *H04L 2025/03681* (2013.01)

(58) Field of Classification Search
CPC .................................................. H04B 10/0795
See application file for complete search history.

(56) References Cited

U.S. PATENT DOCUMENTS

| | | | |
|---|---|---|---|
| 2002/0048062 A1 | 4/2002 | Sakamoto et al. | |
| 2009/0169209 A1 | 7/2009 | Sugawara et al. | |
| 2011/0161738 A1* | 6/2011 | Zhang | H04B 10/58 714/37 |
| 2012/0076508 A1* | 3/2012 | Mezer | H04B 10/697 398/210 |
| 2015/0358085 A1* | 12/2015 | Trimberger | H04B 10/548 398/118 |

FOREIGN PATENT DOCUMENTS

| | | |
|---|---|---|
| JP | 09-130323 A | 5/1997 |
| JP | 2002-057624 A | 2/2002 |
| JP | 2007-259281 A | 10/2007 |
| JP | 2009-159189 A | 7/2009 |
| JP | 2010-278528 A | 12/2010 |

* cited by examiner

*Primary Examiner* — Shi K Li
(74) *Attorney, Agent, or Firm* — Arent Fox LLP

(57) ABSTRACT

A transmission apparatus of a receiving side to receive a signal transmitted from a transmission apparatus of a transmitting side, the transmission apparatus of the receiving side includes: a first monitor configured to measure an eye pattern indicating a signal waveform transition of the signal transmitted from the transmission apparatus of the transmitting side; a pattern analyzer configured to extract a first feature of the eye pattern measured by the first monitor; and a regulation controller configured to cause the transmission apparatus of the transmitting side to adjust at least one of rising and falling of a signal to be transmitted, based on the first feature extracted by the pattern analyzer.

8 Claims, 22 Drawing Sheets

TRANSMISSION APPARATUS

CROSS-REFERENCE TO RELATED APPLICATION

This application is based upon and claims the benefit of priority from the prior Japanese Patent Application No. 2014-243326, filed on Dec. 1, 2014, the entire contents of which are incorporated herein by reference.

FIELD

The embodiments discussed herein are related to a transmission apparatus.

BACKGROUND

In recent years, LTE (Long Time Evolution) is becoming widespread as a 3GPP (Third Generation Partnership Project) based wireless communication technology. In LTE, a base station (eNB: evolved Node B) includes a baseband processing device (BBU: Base Band Unit) and a radio processing device (RRH: Remote Radio Head). Also, the baseband processing device and the radio processing device are connected with each other through an optical transmission line (e.g., an optical cable).

Related techniques are disclosed in, for example, Japanese Laid-Open Patent Publication No. 2009-159189.

SUMMARY

According to an aspect of the invention, a transmission apparatus of a receiving side to receive a signal transmitted from a transmission apparatus of a transmitting side, the transmission apparatus of the receiving side includes: a first monitor configured to measure an eye pattern indicating a signal waveform transition of the signal transmitted from the transmission apparatus of the transmitting side; a pattern analyzer configured to extract a first feature of the eye pattern measured by the first monitor; and a regulation controller configured to cause the transmission apparatus of the transmitting side to adjust at least one of rising and falling of a signal to be transmitted, based on the first feature extracted by the pattern analyzer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
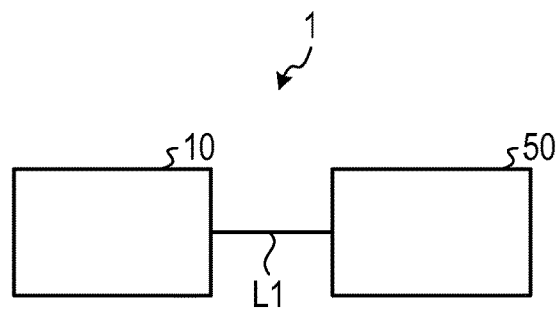
FIG. 1 is a diagram illustrating an example of a communication system according to First Embodiment.

In a conventional base station, a radio processing device feeds an error rate (e.g., BER: Bit Error Rate) of the optical signal transmitted from a baseband processing device back to the baseband processing device. In a case where the fed-back error rate is reduced, the baseband processing device performs an "adjustment processing (that may be referred to as a TX emphasis)" by multiplying an optical signal to be transmitted by a "correction value".

However, since the adjustment processing is performed based on an error rate in the conventional "adjustment processing," it is unpredictable whether which one of a positive direction or a negative direction in which the correction value is intended to be set is good for the adjustment processing. Accordingly, in the conventional "adjustment processing," a correct correction direction and a correction value are specified while adjusting the correction value little by little and a required time taken for the adjustment processing becomes longer, and as a result, there is a possibility that a transmission quality is deteriorated. Further, when the correction direction is incorrectly specified at an early stage of the adjustment processing, a shut off may occur in the optical transmission line in the worst case, which results in a deterioration in transmission quality.

In the following, embodiments of a transmission apparatus of the present disclosure capable of preventing a transmission quality from being deteriorated will be described in detail based on the accompanying drawings. The transmission apparatus of the present disclosure is not limited to the embodiments. Further, same reference numerals are given to constitutional elements having the same function in the embodiments, and the redundant descriptions thereof will be omitted.

First Embodiment

[Summary of Communication System]

FIG. 1 is a diagram illustrating an example of a communication system according to First Embodiment. In FIG. 1, a communication system 1 includes a transmission apparatus 10 at a transmitting side and a transmission apparatus 50 at a receiving side. The transmission apparatus 10 and the transmission apparatus 50 are connected with each other via an optical transmission line L1. For example, one of the transmission apparatus 10 and the transmission apparatus 50 corresponds to a baseband processing device (BBU) and the other corresponds to a radio processing device (RRH). For example, a CPRI (Common Public Radio Interface) is used as a transmission protocol between the transmission apparatus 10 and the transmission apparatus 50.

The transmission apparatus 10 at the transmitting side transmits a "differential signal" to the transmission apparatus 50 through the optical transmission line L1 (e.g., an optical cable).

The transmission apparatus 50 at the receiving side measures an "EYE pattern (that may be referred to as an eye diagram)" which indicates waveform transitions of the received differential signal. The transmission apparatus 50 extracts a feature thereof from the measured eye pattern (which may be referred to as a "first feature" in the following). Also, the transmission apparatus 50 performs an "adjustment control" which causes the transmission apparatus 10 to adjust at least one of a "rising portion" and a "falling portion" of the differential signal to be transmitted, based on the extracted first feature. The adjustment of the "rising portion" of the differential signal to be transmitted may be referred to as a "pre-emphasis." Further, the adjustment of the "falling portion" of the differential signal to be transmitted may be referred to as a "post-emphasis."

Here, the "first feature" may be extracted as follows. That is, the transmission apparatus 50 stores (maintains) a "plurality of feature candidates." The transmission apparatus 50 specifies (extracts) a feature candidate which matches with the measured eye pattern among the plurality of feature candidates as the "first feature." Further, the transmission apparatus 50 stores (maintains) a "correspondence relationship" between the plurality of feature candidates and "adjustment patterns" according to the respective feature candidates. The transmission apparatus 50 then specifies an adjustment pattern to be applied based on the specified feature candidate and the "correspondence relationship." An adjustment control according to the specified adjustment pattern to be applied is performed.

As described above, the feature of the measured eye pattern is applied as the reference of the "adjustment control" in the communication system 1. Since an appropriate correction direction may be predicted in the adjustment control according to the feature of the eye pattern, the "adjustment control" may be performed based on the "feature of the measured eye pattern" so as to prevent the deterioration of transmission quality.

[Example of Configuration of a Transmission Apparatus at a Transmitting Side]

Figure 2:
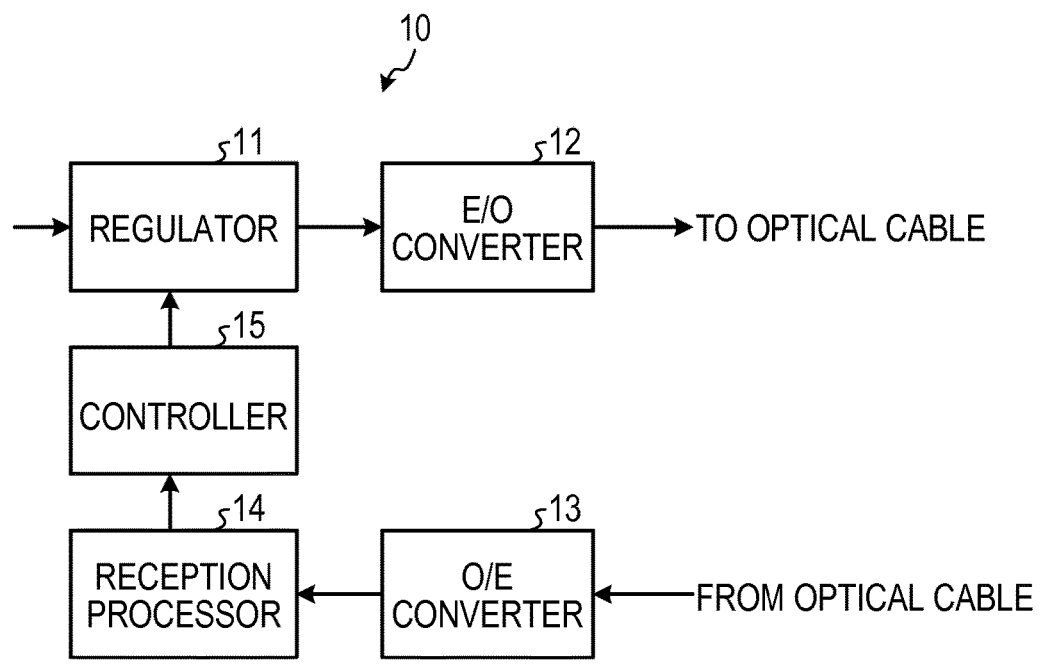
FIG. 2 is a block diagram illustrating an example of a transmission apparatus at a transmitting side according to First Embodiment.

FIG. 2 is a block diagram illustrating an example of a transmission apparatus at a transmitting side according to First Embodiment. In FIG. 2, the transmission apparatus 10 includes a regulator 11, an E/O converter 12, an O/E converter 13, a reception processor 14, and a controller 15.

The regulator 11 receives the high-speed differential signal to be transmitted and the "adjustment signal (that is, adjustment value)" from the controller 15, and multiplies the high-speed differential signal to be transmitted by the adjustment signal so as to adjust at least one of the "rising portion" and the "falling portion" of the high-speed differential signal to be transmitted. In the adjustment processing described above, at least one of the phase and amplitude of the high-speed differential signal to be transmitted is adjusted. For example, a plurality of adjustment value candidates are prepared for each of the phases and the amplitudes in the adjustment signal (that is, adjustment value). Further, a reference adjustment value corresponding to a "first reference value" and a plurality of adjustment value candidates above the reference adjustment value and a plurality of adjustment value candidates below the reference adjustment value are included in the plurality of adjustment value candidates for the phases. Similarly, a reference adjustment value corresponding to a "second reference value" and a plurality of adjustment value candidates above the reference adjustment value and a plurality of adjustment value candidates below the reference adjustment value are included in the plurality of adjustment value candidates for the amplitudes. The "first reference value" and the "second reference value" are values to be set in order for the high-speed differential signal to be transmitted to obtain an eye pattern opened in a predetermined level or more in an input terminal of the E/O converter 12, for example, before the shipment of the transmission apparatus 10. That is, the "first reference value" and the "second reference value" correspond to the inverse characteristics of the "delay characteristic" and the "attenuation characteristic" in the connection line between the regulator 11 and the E/O converter 12, respectively. Also, in a case where the eye pattern opened in a predetermined level or more is not obtained by the adjustment processing using the "first reference value" and the "second reference value" due to a certain cause, that is, in a case where a certain change occurs in the "delay characteristic" and the "attenuation characteristics," the adjustment processing is performed by using an adjustment value other than the "first reference value" and the "second reference value."

Also, the high-speed differential signal to be transmitted for which the adjustment processing is performed by the regulator 11 is output to the E/O converter 12.

The E/O converter 12 converts the high-speed differential signal to be transmitted received by the regulator 11 from the electrical signal to the optical signal and sends the obtained optical signal to the optical transmission line L1 (optical cable). The sent optical signal is transmitted to the transmission apparatus 50 at the receiving side.

The O/E converter 13 receives the optical signal transmitted from the transmission apparatus 50 at the receiving side, converts the received optical signal into the electrical signal, and outputs the obtained electrical signal (that is, a received electrical signal) to the reception processor 14.

The reception processor 14 performs a predetermined reception processing (e.g., demodulation and decoding) on the received electrical signal to obtain received data. The reception processor 14 extracts "information about the adjustment pattern to be applied" from the received data and outputs the extracted information to the controller 15.

The controller 15 specifies an adjustment value candidate corresponding to the "adjustment pattern to be applied" indicated by the information received from the reception processor 14 and outputs the adjustment signal corresponding to the specified adjustment value candidate to the regulator 11.

[Example of Configuration of a Transmission Apparatus at a Receiving Side]

Figure 3:
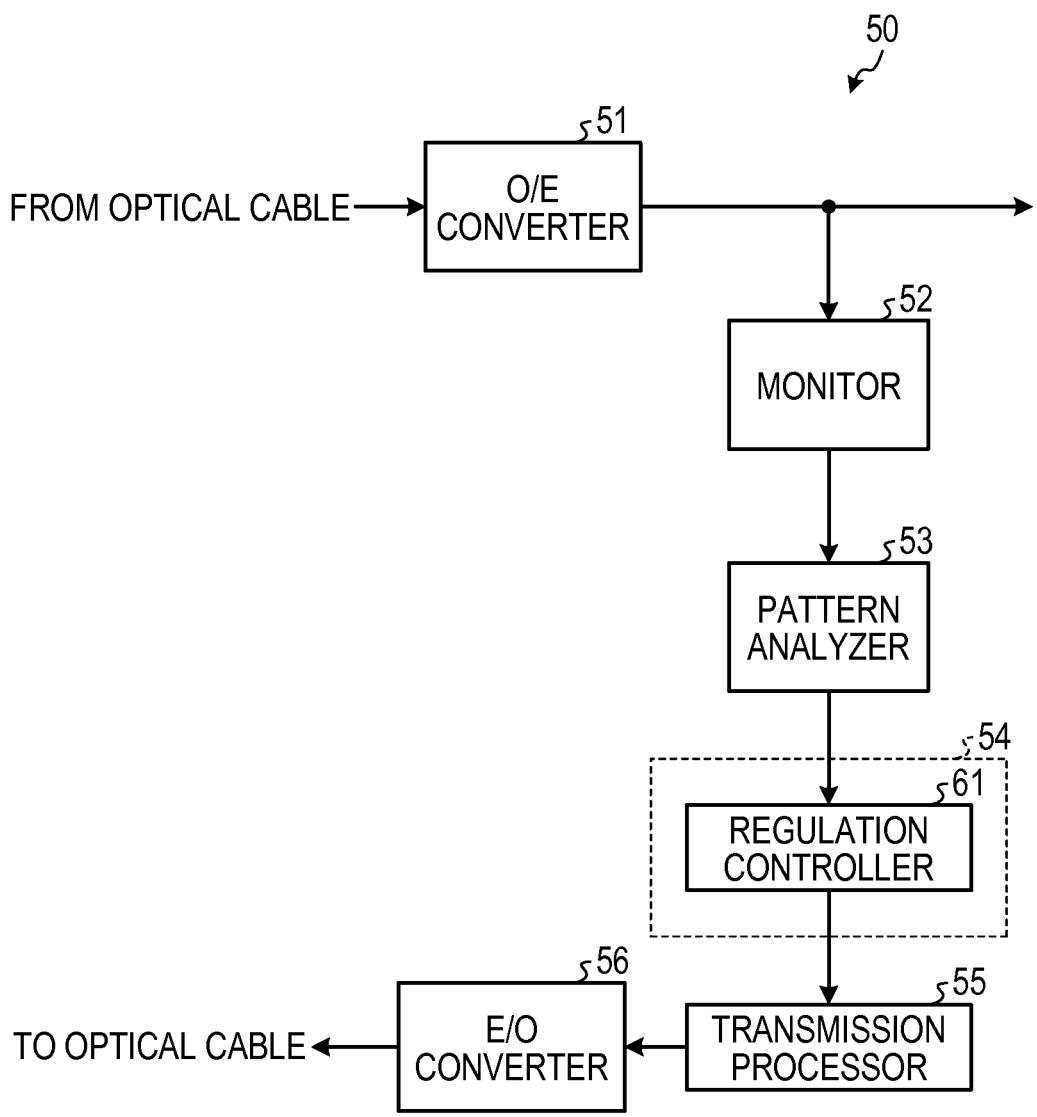
FIG. 3 is a block diagram illustrating an example of a transmission apparatus at a receiving side according to First Embodiment.

FIG. 3 is a block diagram illustrating an example of a transmission apparatus at a receiving side according to First Embodiment. In FIG. 3, the transmission apparatus 50 includes an O/E converter 51, a monitor 52, a pattern analyzer 53, and a controller 54. Further, the transmission apparatus 50 includes a transmission processor 55 and an E/O converter 56. The controller 54 includes a regulation controller 61.

The O/E converter 51 receives the optical signal transmitted from the transmission apparatus 10 at the transmitting side, converts the received optical signal into the electrical signal, and outputs the obtained electrical signal (high-speed differential signal).

The monitor 52 monitors (measures) an eye pattern of the electrical signal (high-speed differential signal) output from the O/E converter 51.

The pattern analyzer 53 extracts the feature (that is, the first feature) of the eye pattern (in the following, may be referred to as a "measured eye pattern") measured by the monitor 52. The pattern analyzer 53 stores (maintains), for example, the "plurality of feature candidates." Also, the pattern analyzer 53 specifies (extracts) the feature candidate which matches with the measured eye pattern among the plurality of feature candidates as the "first feature." For example, each feature candidate contains a plurality of "partial features." For example, each feature candidate includes "partial features" corresponding to each of a "front area", a "central area", and a "rear area" of an eye pattern arranged in a single UI (Unit Interval).

For example, the pattern analyzer 53 stores information about a subarea determined as having a small amplitude (in the following, may be referred to as a "small determination area") and a subarea determined as having a large amplitude (in the following, may be referred to as a "large determination area") in an area (in the following, may be referred to as a "unit interval area") in which the horizontal axis represents a time (that is, a unit interval) and the vertical axis represents an amplitude. The "small determination area" is an area which becomes enlarged from the origin (that is, a center of the unit interval and a point at which the amplitude is zero) of the unit interval area outwardly. In the following, a boundary between the small determination area and an area other than the small determination area may be referred to as a "small eye mask." Further, the "large determination area" is an area located outside of a "large eye mask" around the origin of the unit interval area. The "large eye mask" is a boundary between the "large determination area" and an area (including the small determination area) other than the large determination area. Further, in the following, an area interposed between the "small eye mask" and the "large eye mask" may be referred to as a "proper area." Also, the pattern analyzer 53 specifies which one of the "small determination area," the "large determination area," and the "proper area" includes, among the measured eye patterns, each of three "partial eye patterns" corresponding to each of a "front area", a "central area," and a "rear area," so as to specify the "partial feature." The pattern analyzer 53 defines the feature candidate including three "partial features" specified for the "front area," the "central area," and the "rear area," respectively, as the "first feature."

The pattern analyzer 53 outputs information about the extracted "first feature" to the regulation controller 61.

The regulation controller 61 performs the "adjustment control" which causes the transmission apparatus 10 at the transmitting side to adjust at least one of the "rising portion" and the "falling portion" of the high-speed differential signal to be transmitted, based on the "first feature" extracted by the pattern analyzer 53.

The regulation controller 61 stores, for example, the "correspondence relationship" between the plurality of feature candidates and the "adjustment patterns" according to the respective feature candidates. Also, the regulation controller 61 specifies the "adjustment pattern" which is in correspondence to the "first feature" extracted by the pattern analyzer 53 in the "correspondence relationship" as the "adjustment pattern to be applied." Also, the regulation controller 61 outputs the information signal about the specified "adjustment pattern to be applied" to the transmission processor 55. Here, the "adjustment patterns" may include, for example, a pattern in which an adjustment value for the phase is raised or lowered by one step, a pattern in which an adjustment value for the amplitude is lowered by one step, and a pattern in which any one of the phase and the amplitude is not adjusted.

Here, an example of the correspondence relationship between the plurality of feature candidates and the adjustment patterns according to the respective feature candidates will be described in the following.

For example, an adjustment pattern of "no adjustment" is made to correspond to the "first feature candidate" indicating the eye pattern that falls in the proper area in all the partial features of the front area, the central area, and the rear area. Further, an adjustment pattern of "lowering the adjustment value for amplitude by one step" is made to correspond to the "second feature candidate" indicating the eye pattern that falls in the large determination area in all the partial features of the front area, the central area, and the rear area. Further, an adjustment pattern of "raising the adjustment value for phase by one step" is made to correspond to the "third feature candidate" indicating the eye pattern in which the central area is not included in the large determination area, but at least one of the front area and the rear area is included in the large determination area. Further, an adjustment pattern of "lowering the adjustment value for phase by one step" is made to correspond to the "fourth feature candidate" indicating the eye pattern in which the front area and the rear area fall in the proper area and the central area is included in the small determination area.

The transmission processor 55 performs a predetermined transmission processing (e.g., encoding or modulation) on the information signal received from the regulation controller 61 and outputs the obtained signal to be transmitted to the E/O converter 56.

The E/O converter 56 converts the signal to be transmitted received from the transmission processor 55 from the electrical signal to the optical signal and sends the obtained optical signal to the optical transmission line L1 (optical cable). The sent optical signal is transmitted to the transmission apparatus 10 at the transmitting side.

[Example of Operations of Communication System]

Figure 4:
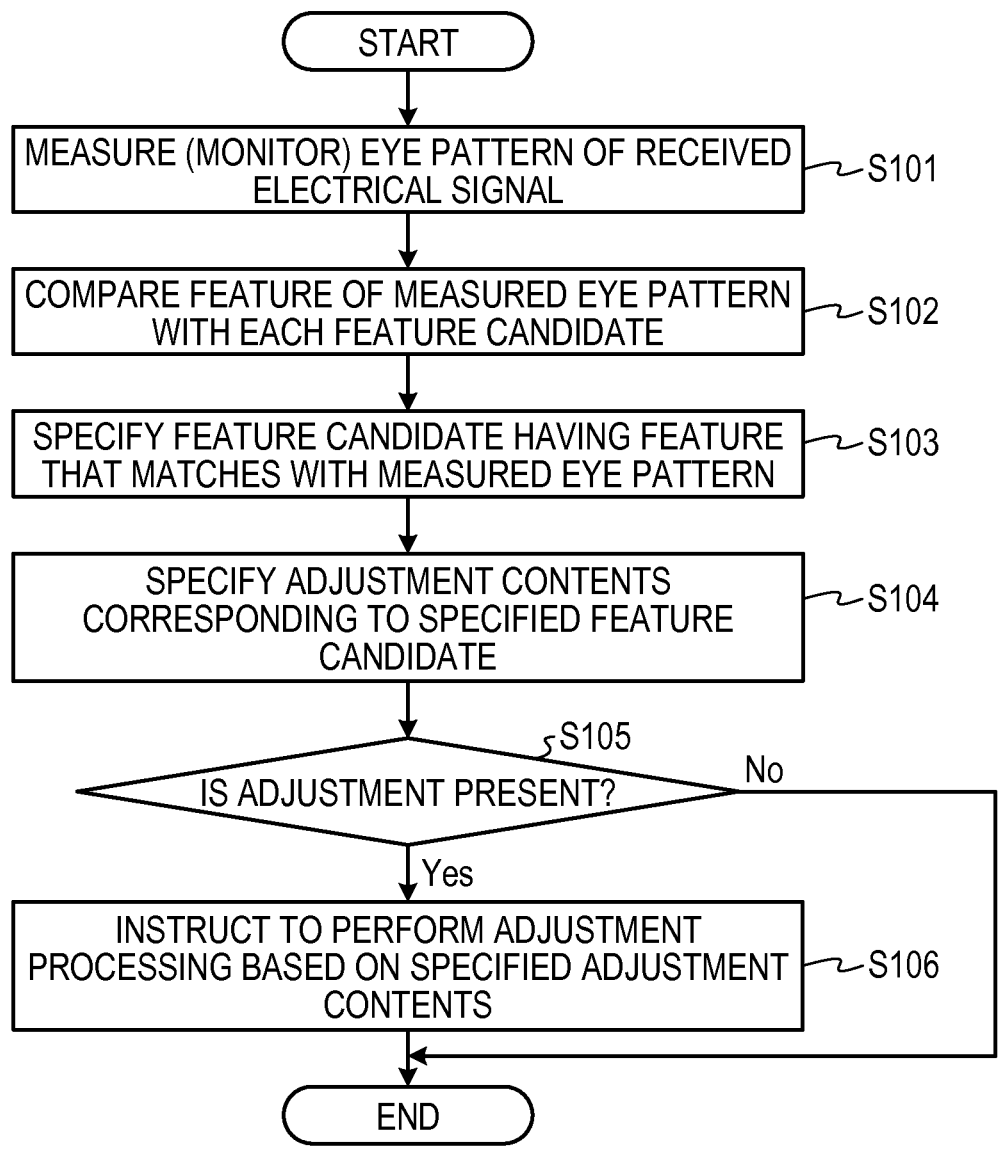
FIG. 4 is a flowchart illustrating an example of processing operations of the transmission apparatus at the receiving side according to First Embodiment.

Descriptions will be made on an example of processing operations of the communication system 1 having the configuration as described above. Here, especially, descriptions will be made on the processing operations of the transmission apparatus 50 at the receiving side. FIG. 4 is a flowchart illustrating an example of processing operations of the transmission apparatus at the receiving side according to First Embodiment.

In the transmission apparatus 50, the monitor 52 measures (monitors) the eye pattern of the electrical signal output from the O/E converter 51 (that is, received electrical signal) (Operation S101).

The pattern analyzer 53 compares the feature of the measured eye pattern with each feature candidate (Operation S102), and specifies the feature candidate (that is, the first feature) having the feature that matches with the measured eye pattern (Operation S103).

The regulation controller 61 specifies the adjustment pattern (that is, adjustment contents) that corresponds to the feature candidate specified by the pattern analyzer 53 in the "correspondence relationship" (Operation S104).

Also, when it is determined that the specified adjustment pattern corresponds to an "adjustment is present" ("YES" at Operation S105), the regulation controller 61 instructs the transmission apparatus 10 at the transmitting side to perform the adjustment processing based on the specified adjustment contents (Operation S106). That is, the regulation controller 61 transmits the information signal about the specified "adjustment pattern to be applied" to the transmission apparatus 10 through the transmission processor 55 and the E/O converter 56.

In the meantime, when it is determined that the specified adjustment pattern corresponds to an "adjustment is none" ("NO" at Operation S105), the processing flow of FIG. 4 is ended.

According to the present embodiment as described above, the pattern analyzer 53 extracts the "first feature" of the eye pattern measured by the monitor 52 in the transmission apparatus 50 at the receiving side. The regulation controller 61 causes the transmission apparatus 10 at the transmitting side to adjust at least one of rising and falling of the differential signal to be transmitted based on the "first feature" extracted by the pattern analyzer 53. For example, the pattern analyzer 53 specifies the feature candidate that is matching with the measured eye pattern among the plurality of feature candidates as the "first feature." Also, the regulation controller 61 specifies the adjustment pattern to be applied based on the feature candidate specified by the pattern analyzer 53 and the "correspondence relationship" between the plurality of feature candidates and the adjustment patterns according to the respective feature candidates.

With the configuration of the transmission apparatus 50, since the "adjustment processing" may be performed based on the "measured eye pattern" which may become a predictive index for a proper correction direction in the "adjustment control," the deterioration of transmission quality may be prevented. Further, according to the "adjustment processing" of the present embodiment, since the possibility of a shut off may be reduced, a time zone during which the adjustment processing is performed is not limited to, for example, a time zone during which traffic volume is small. Accordingly, the adjustment efficiency may be improved.

Second Embodiment

Second Embodiment is related to a specific example of the processing operation of the transmission apparatus 50 of First Embodiment. The basic configuration of a transmission apparatus at a receiving side of Second Embodiment is the same as that of the transmission apparatus 50, and thus descriptions thereof will be made with reference to FIG. 3.

Figure 5:
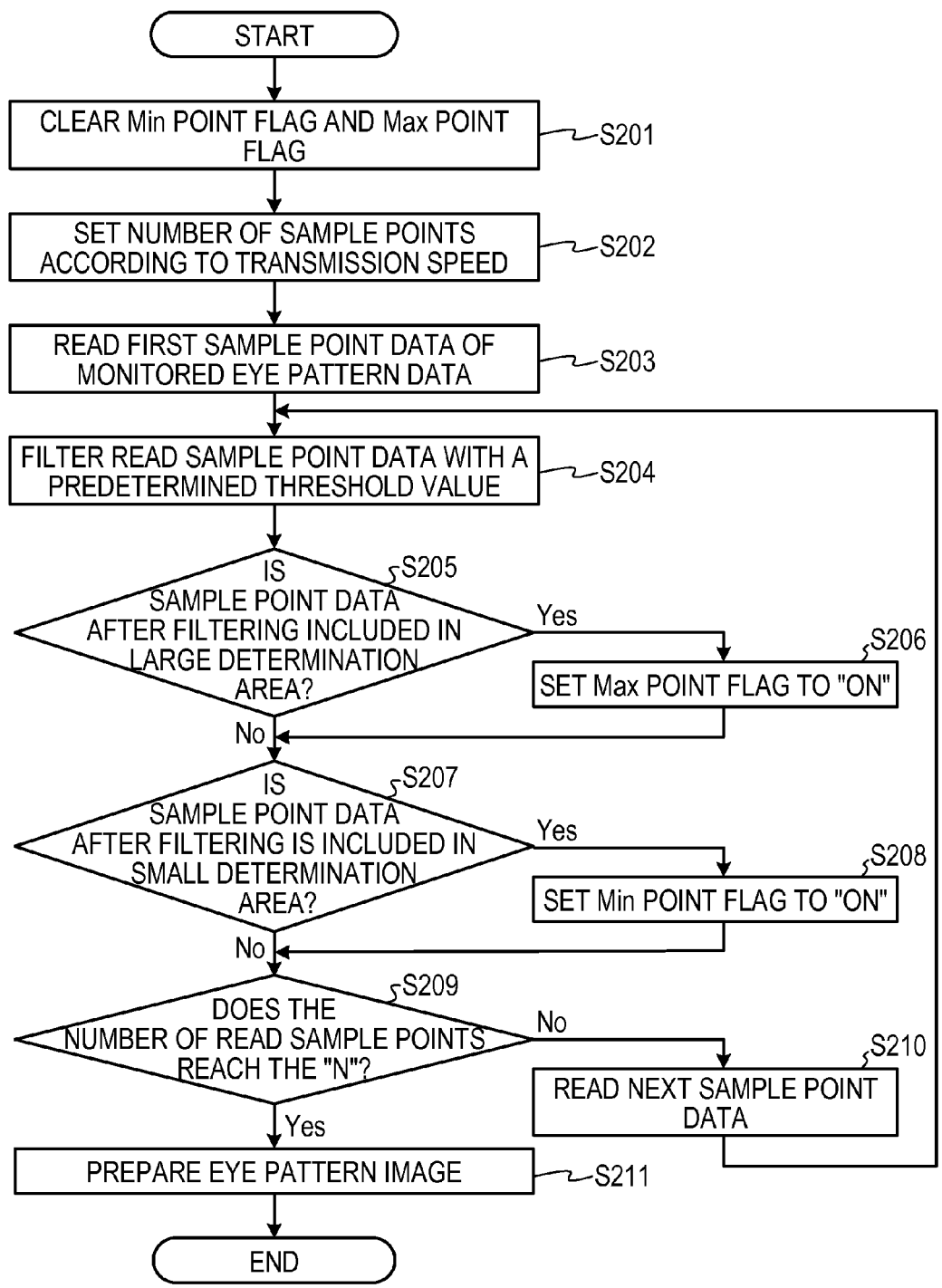
FIG. 5 is a flowchart provided for explaining a preparation processing in an analysis processing of a measured eye pattern according to Second Embodiment.

FIG. 5 is a flowchart provided for explaining a preparation processing in an analysis processing of a measured eye pattern according to Second Embodiment.

The pattern analyzer 53 clears a Min point flag and a Max point flag (Operation S201).

The pattern analyzer 53 sets the number of sample points "n" according to a transmission speed between the transmission apparatus 10 and the transmission apparatus 50 (Operation S202). For example, in a case where the maximum value of the number of sample points capable of being read in a single unit interval is set to 11 (eleven), the pattern analyzer 53 sets the "n" to 5 (five), e.g., n=5 (sample points: (1), (2), (6), (10), (11)) at a transmission speed of 2.4 Gbps. Further, the pattern analyzer 53 sets the "n" to 7 (seven), e.g., n=7 (sample points: (1), (2), (4), (6), (8), (10), (11)) at a transmission speed of 4.9 Gbps. Further, the pattern analyzer 53 sets the "n" to 11 (eleven), e.g., n=11 (sample points: (1) to (11)) at a transmission speed of 9.8 Gbps. Accordingly, the number of sample points intended to be read may be set to the maximum value making it possible to perform a detailed eye pattern analysis processing in a case where the transmission speed is relatively high (e.g., 9.8 Gbps) while the number of sample points intended to be read may be decreased to reduce a processing load in a case where the transmission speed is relatively low (e.g., 2.4 Gbps and 4.9 Gbps).

The pattern analyzer 53 reads a first sample point data (that is, sample point data of sample point (1)) of the monitored EYE pattern data maintained in the monitor 52 (Operation S203).

Figure 6:
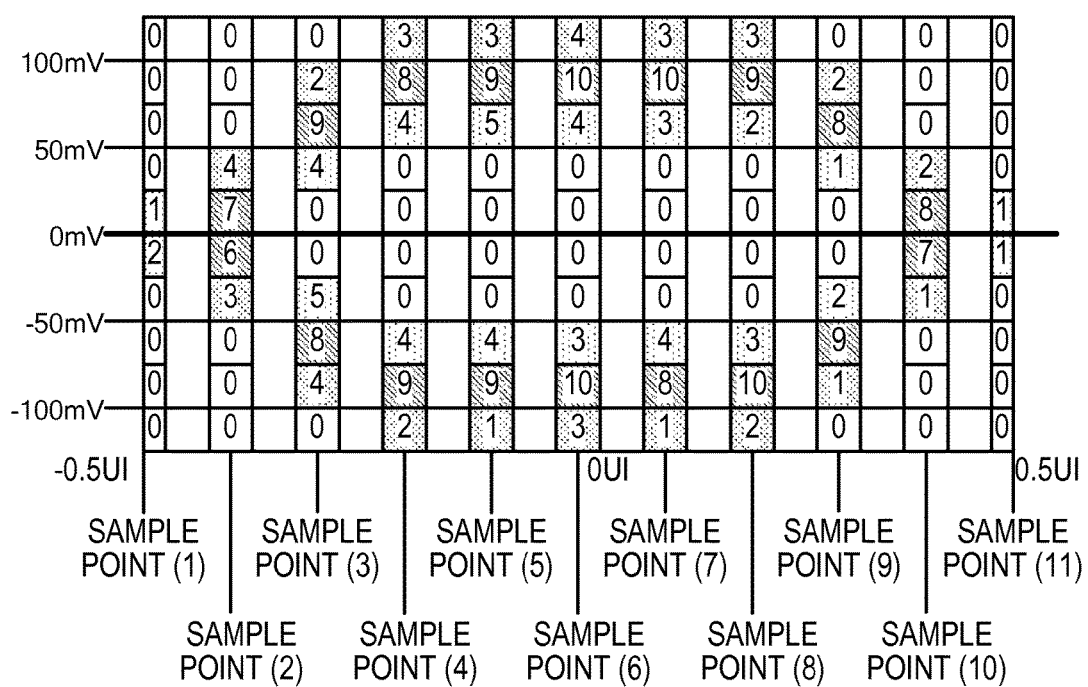
FIG. 6 is a diagram provided for explaining reading of sample point data according to Second Embodiment.

FIG. 6 is a diagram provided for explaining reading of the sample point data according to Second Embodiment. In FIG. 6, a situation where the sample point data of the sample points (1) to (11) are read is illustrated. In FIG. 6, a "unit interval area" is represented and each mass corresponds to a "unit area." The "unit area" corresponds to a pair of the phase and the amplitude of the received electrical signal and is a target area for which the number of times in which a pair of the phase and the amplitude has appeared in the received electrical signal is counted. In FIG. 6, the number represented within the mass indicates the counted number for the appearance of the pair of the phase and the amplitude.

Figure 7:
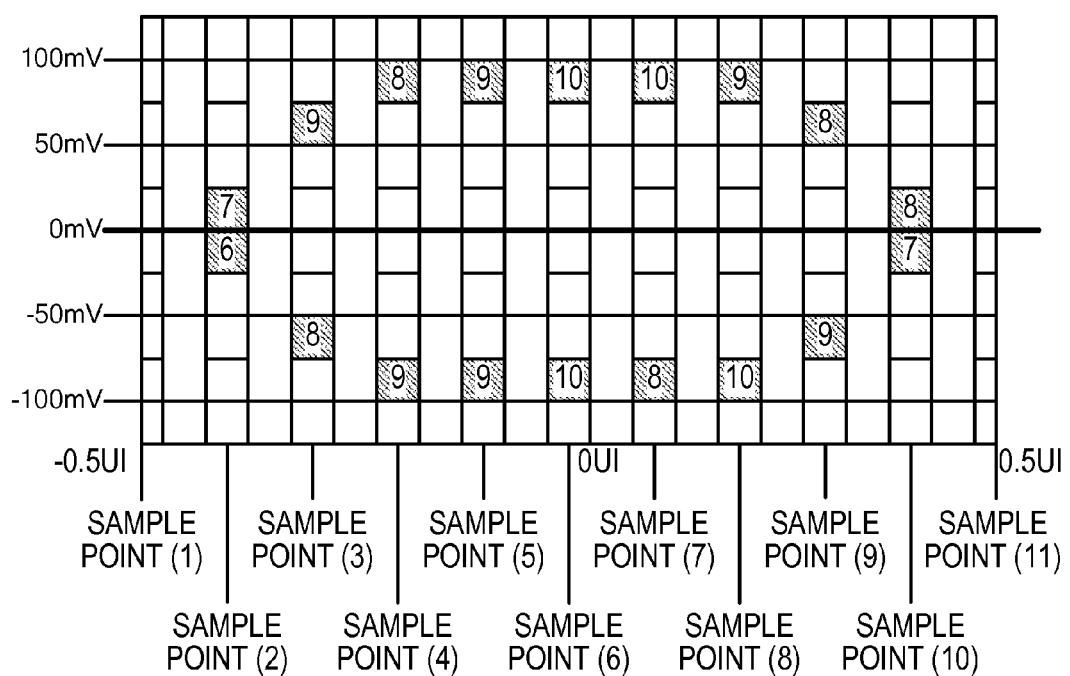
FIG. 7 is a diagram provided for explaining a filtering processing according to Second Embodiment.

Referring back to the description of FIG. 5, the pattern analyzer 53 filters the read sample point data with a predetermined threshold value (Operation S204). That is, the pattern analyzer 53 performs a processing of discarding data of the unit area that is the counted number less than the predetermined threshold value and leaving data of the unit area that is the counted number equal to or greater than the predetermined threshold value. FIG. 7 illustrates a result obtained by performing the filtering processing on the sample point data of FIG. 6 in a case where the predetermined threshold value is set to 6 (six). FIG. 7 is a diagram provided for explaining a filtering processing according to Second Embodiment.

Figure 8:
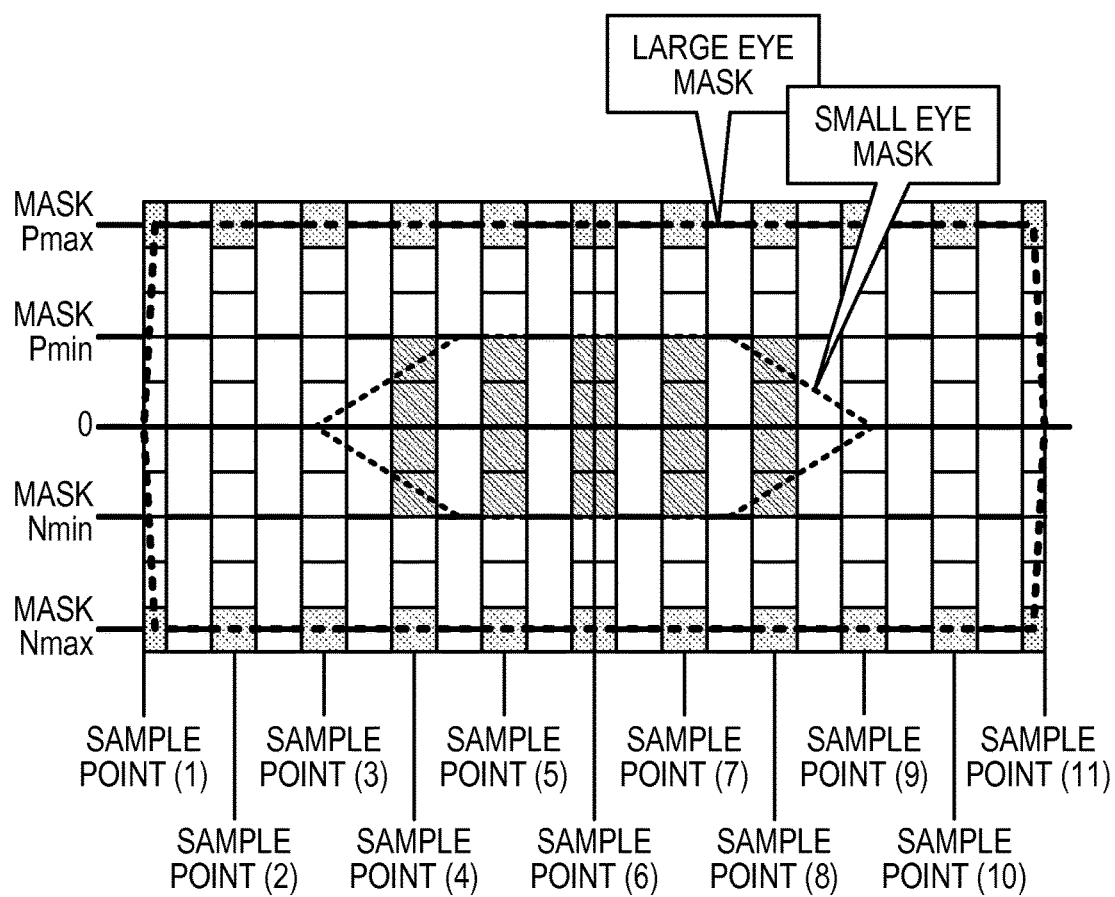
FIG. 8 is a diagram provided for explaining a large determination area and a small determination area Second Embodiment.

The pattern analyzer 53 determines whether the sample point data after the filtering is included in a "large determination area" (Operation S205). FIG. 8 is a diagram provided for explaining a large determination area and a small determination area. In FIG. 8, the large eye mask and the small eye mask are indicated by being superimposed on the unit interval area. As described above, the "large determination area" is an area located outside of the large eye mask. Further, the "small determination area" is an area located inside of the small eye mask.

When it is determined that the sample point data after the filtering is included in the "large determination area"

("YES" at Operation S205), the pattern analyzer 53 sets the Max point flag of the sample point to "ON" (Operation S206). When it is determined that the sample point data after the filtering is not included in the "large determination area" ("NO" at Operation S205), the processing operation proceeds to Operation S207.

The pattern analyzer 53 determines whether the sample point data after the filtering is included in a "small determination area" (Operation S207).

When it is determined that the sample point data after the filtering is included in the "small determination area" ("YES" at Operation S207), the pattern analyzer 53 sets the Min point flag of the sample point to "ON" (Operation S208). When it is determined that the sample point data after the filtering is not included in the "small determination area" ("NO" at Operation S207), the processing operation proceeds to Operation S209.

The pattern analyzer 53 determines whether the number of read sample points reaches the number "n" (Operation S209).

When it is determined that the number of read sample points does not reach the number "n" ("NO" at Operation S209), the pattern analyzer 53 reads the sample point data (that is, the sample point data of the sample point (2) in the example described above) next to the monitored EYE pattern data maintained in the monitor 52 (Operation S210). The processing at Operations S204 to S210 described above is repeated until the number of read sample points reaches the number of sample points "n" which is set according to the transmission speed.

Figure 9:
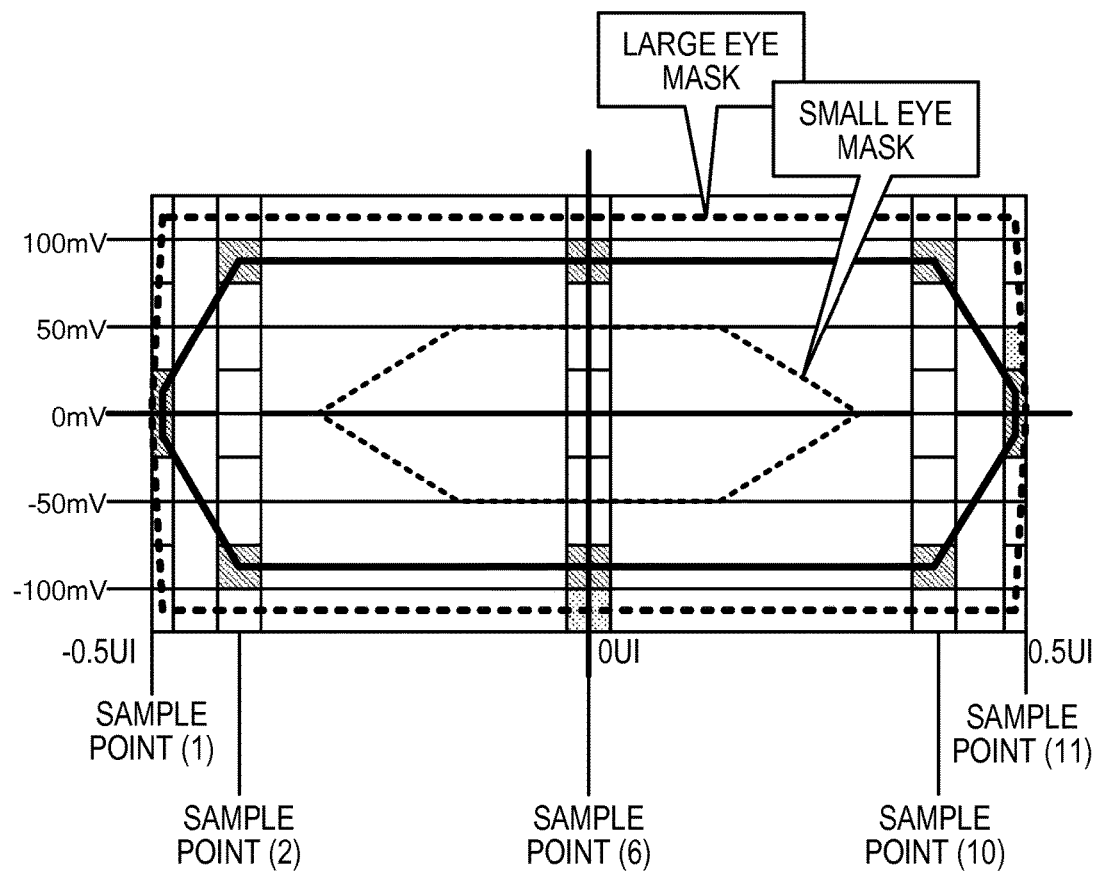
FIG. 9 is a diagram illustrating an example of an eye pattern image.
Figure 10:
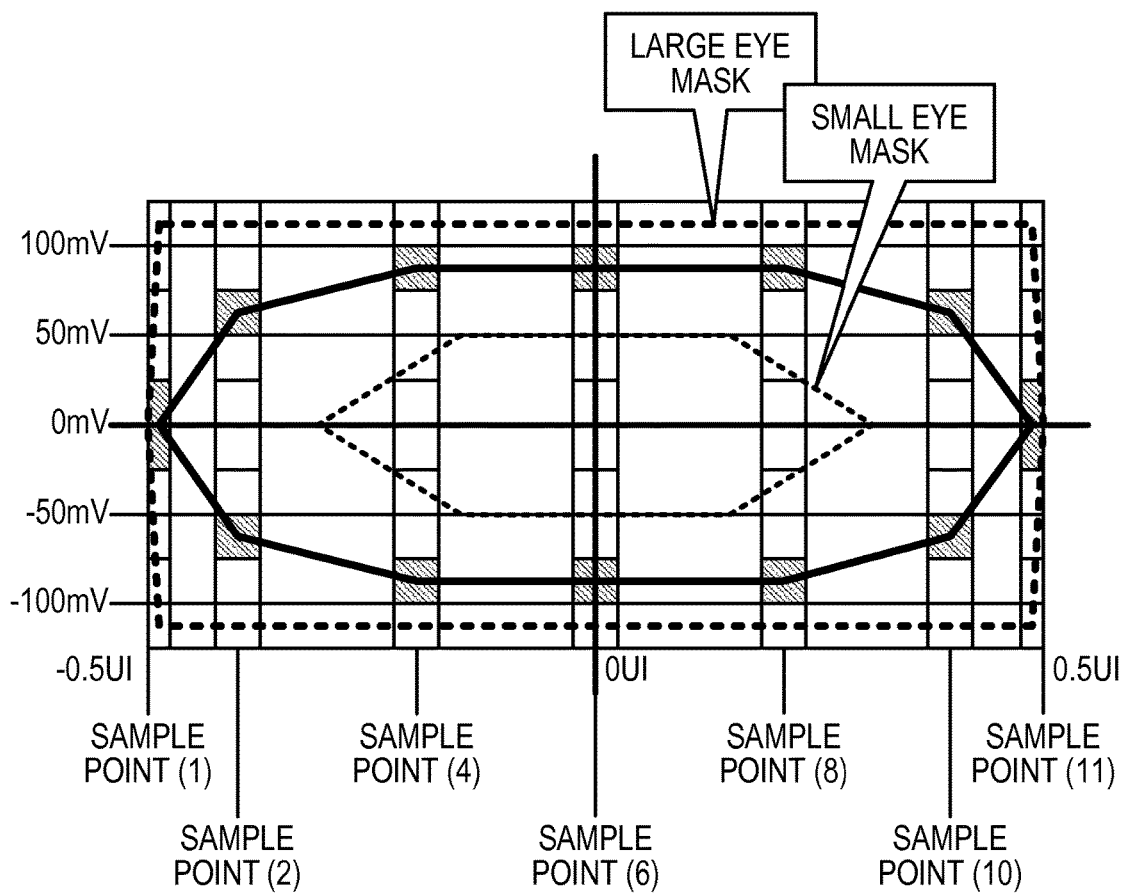
FIG. 10 is a diagram illustrating another example of the eye pattern image.
Figure 11:
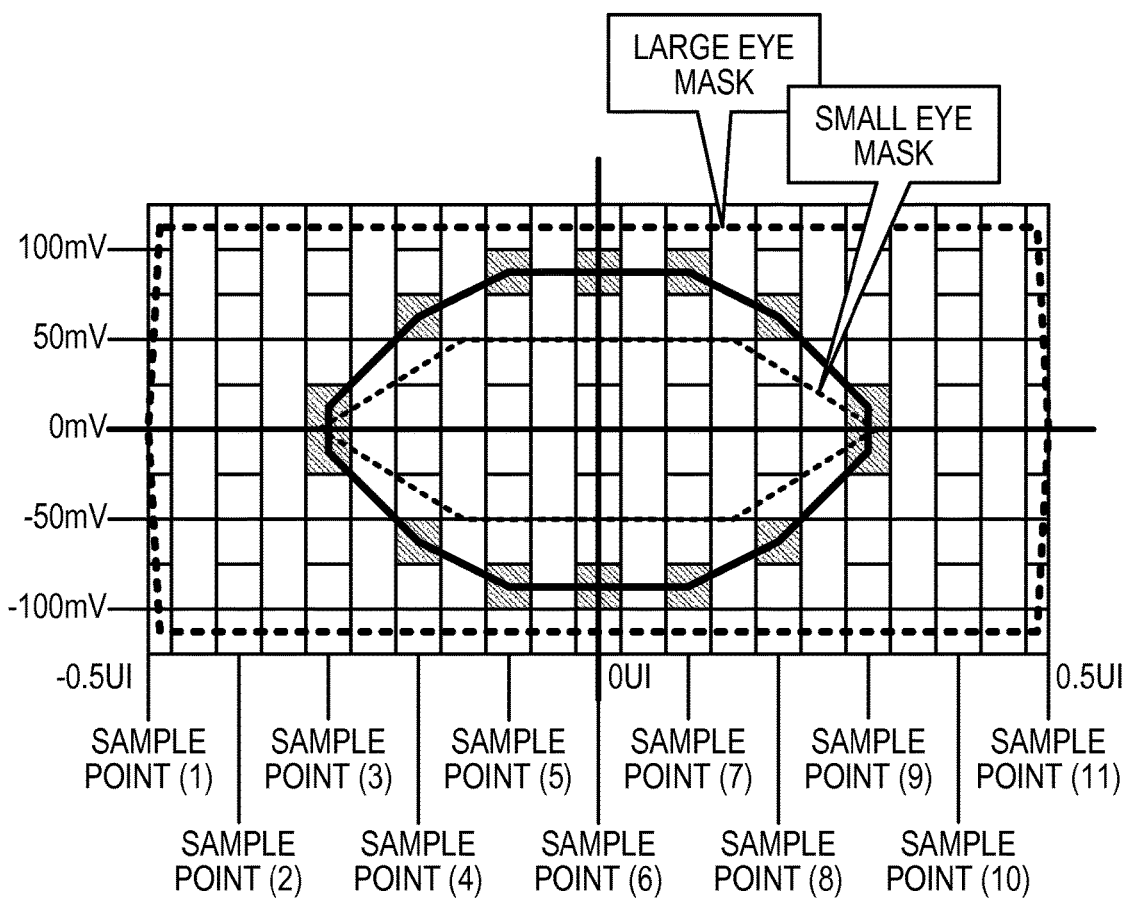
FIG. 11 is a diagram illustrating another example of the eye pattern image.
Figure 12:
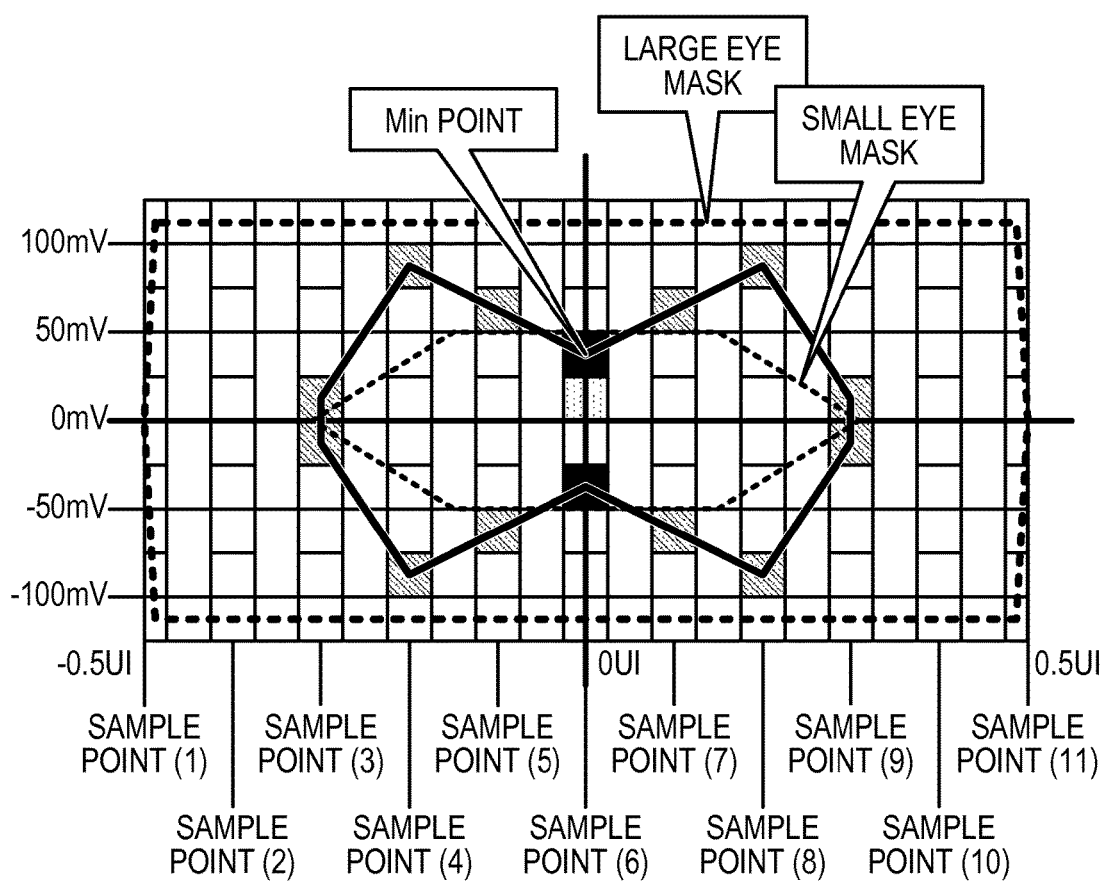
FIG. 12 is a diagram illustrating another example of the eye pattern image.
Figure 13:
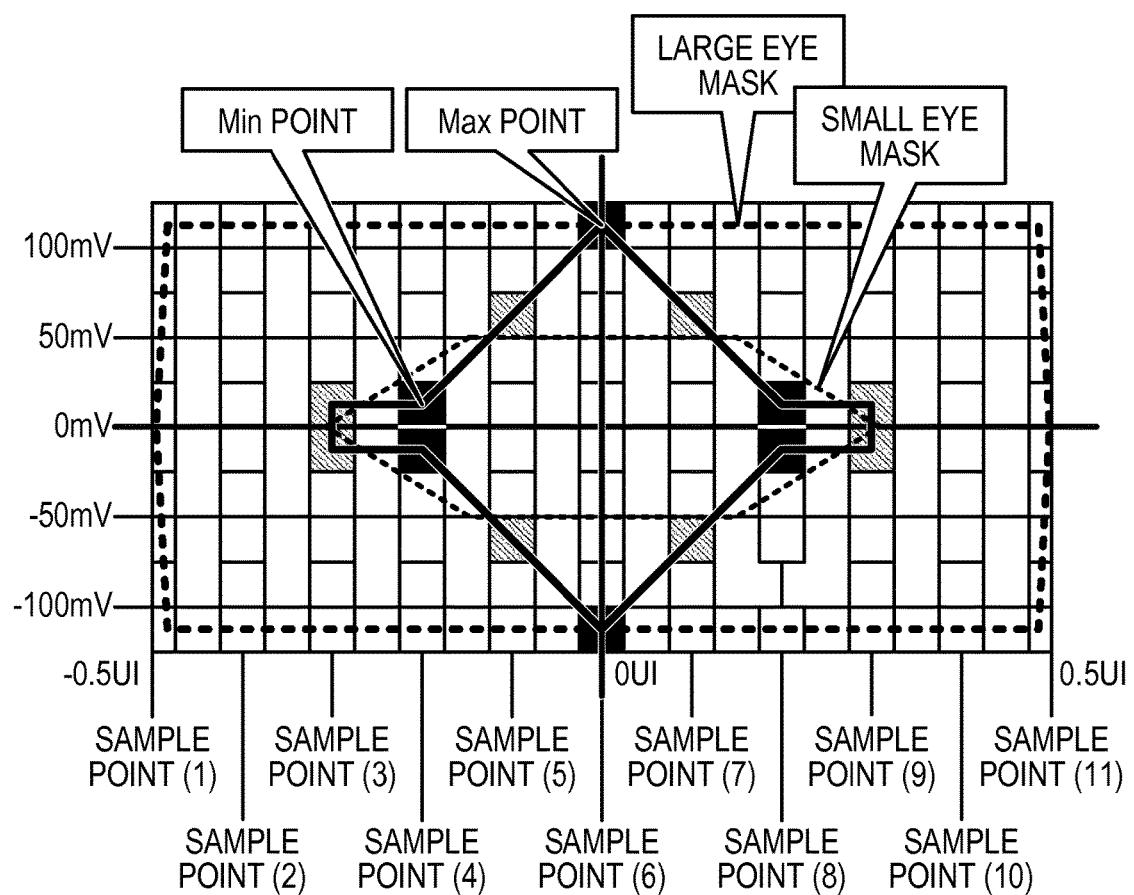
FIG. 13 is a diagram illustrating another example of the eye pattern image.

When it is determined that the number of read sample points reaches the number "n" ("YES" at Operation S209), the pattern analyzer 53 prepares an eye pattern image (Operation S211). That is, the pattern analyzer 53 prepares an image (that is, the eye pattern image) in which the sample point data after the filtering, the large eye mask, the small eye mask, the Max point flag, and the Min point flag obtained at the processings of Operations S201 to S210 are in correspondence with each other. FIG. 9 to FIG. 13 are diagrams each of which illustrates an example of an eye pattern image. In FIG. 9, an example of the eye pattern image is illustrated in a case where the transmission speed is 2.4 Gbps. In FIG. 10, an example of the eye pattern image is illustrated in a case where the transmission speed is 4.9 Gbps. In FIG. 11 to FIG. 13, examples of the eye pattern images are illustrated, respectively, in a case where the transmission speed is 9.8 Gbps. Further, in FIG. 9 to FIG. 11, the examples in which the eye pattern is included in the "proper area", that is, examples in which both of the Max point flag and the Min point flag are not in the state of being "ON" are illustrated. Further, an example in which the Min point flag is in the state of being ON is illustrated in FIG. 12 and an example in which both of the Max point flag and the Min point flag are in the state of being ON is illustrated in FIG. 13. Here, in a case where the eye pattern image becomes an image illustrated in FIG. 12 or FIG. 13, there is a possibility that the BER in the communications between the transmission apparatus 10 and the transmission apparatus 50 is deteriorated or a shut off may occur. Further, as illustrated in FIG. 13, when the eye pattern image in which the Max point flag is in a state of being "ON" is obtained, there is a possibility that the received electrical signal having the amplitude larger than a value defined in a device specification appears.

Figure 14:
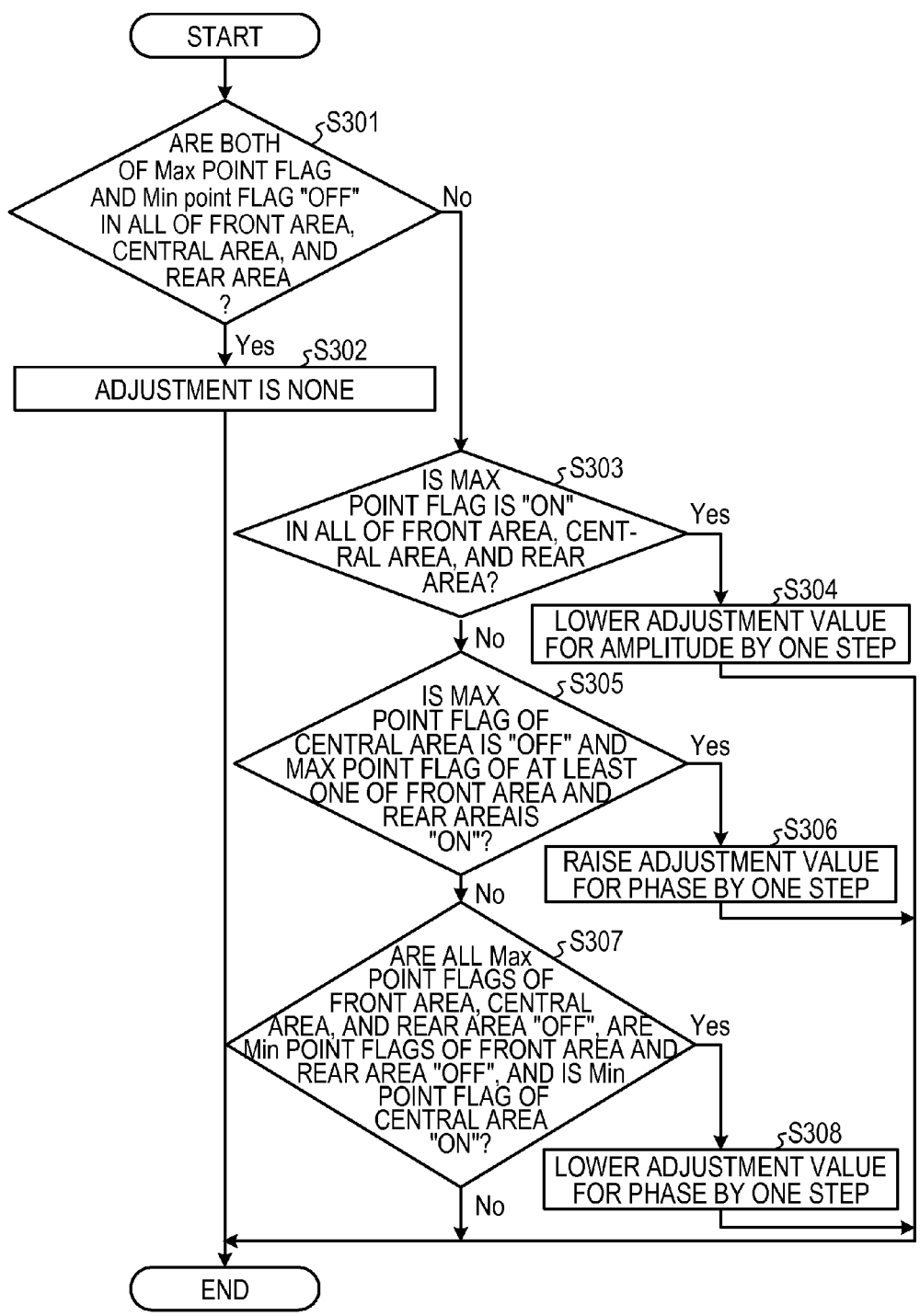
FIG. 14 is a flowchart provided for explaining an analysis processing and an adjustment control process according to Second Embodiment.

Next, descriptions will be made on an analysis processing of the measured eye pattern using the prepared eye pattern image and an adjustment control processing. FIG. 14 is a flowchart provided for explaining an analysis processing and an adjustment control processing according to Second Embodiment.

The pattern analyzer 53 determines whether the feature of the eye pattern image (e.g., the feature of the measured eye pattern) matches with the "first feature candidate" (Operation S301). The "first feature candidate" has a feature in which both of the Max point flag and the Min point flag are in a state of being "OFF" in all of the front area, the central area, and the rear area. That is, in the "first feature candidate," the eye pattern image is included in the proper area in all of the front area, the central area, and the rear area. Here, when the transmission speed is 2.4 Gbps, the front area corresponds to the sample points (1) and (2), the central area corresponds to the sample point (6), and the rear area corresponds to the sample points (10) and (11). Further, when the transmission speed is 4.9 Gbps, the front area corresponds to the sample points (1) and (2), the central area corresponds to the sample points (4), (6), and (8), and the rear area corresponds to the sample points (10) and (11). Furthermore, when the transmission speed is 9.8 Gbps, the front area corresponds to the sample points (1), (2), and (3), the central area corresponds to the sample points (4), (6), and (8), and the rear area corresponds to the sample points (9), (10), and (11).

When it is determined that the feature of the measured eye pattern matches with the "first feature candidate" ("YES" at Operation S301), since the adjustment pattern correspond to the "adjustment is none," the regulation controller 61 does not perform the adjustment processing (Operation S302).

When it is determined that the feature of the measured eye pattern is not matching with the "first feature candidate" ("NO" at Operation S301), the pattern analyzer 53 determines whether the feature of the eye pattern image (e.g., the feature of the measured eye pattern) matches with the "second feature candidate" (Operation S303). The "second feature candidate" has a feature in which the Max point flag is in a state of being "ON" in all of the front area, the central area, and the rear area. That is, in the "second feature candidate," the eye pattern image is included in the large determination area in all of the front area, the central area, and the rear area.

When it is determined that the feature of the measured eye pattern matches with the "second feature candidate" ("YES" at Operation S303), the regulation controller 61 performs the adjustment control using the "adjustment pattern" that lowers the adjustment value for the amplitude by one step (Operation S304).

When it is determined that the feature of the measured eye pattern is not matching with the "second feature candidate" ("NO" at Operation S303), the pattern analyzer 53 determines whether the feature of the eye pattern image (that is, feature of the measured eye pattern) matches with the "third feature candidate" (Operation S305). The "third feature candidate" has a feature in which the Max point flag of the central area is in a state of being "OFF" and the Max point flag of at least one of the front area and the rear area is in a state of being "ON."

When it is determined that the feature of the measured eye pattern matches with the "third feature candidate" ("YES" at Operation S305), the regulation controller 61 performs the adjustment control using the "adjustment pattern" that raises the adjustment value for the phase by one step (Operation S306). Here, the "adjustment pattern" that raises the adjustment value for the phase by one step contributes to the increase of the amplitude in the regulator 11 at the transmitting side.

When it is determined that the feature of the measured eye pattern is not matching with the "third feature candidate" ("NO" at Operation S305), the pattern analyzer 53 determines whether the feature of the eye pattern image (that is, feature of the measured eye pattern) matches with the "fourth feature candidate" (Operation S307). The "fourth feature candidate" has a feature in which the Max point flags of all of the front area, the central area, and the rear area are in a state of being "OFF," the Min point flags of the front area and the rear area are in a state of being "OFF," and the Min point flag of the central area is in a state of being "ON."

When it is determined that the feature of the measured eye pattern matches with the "fourth feature candidate" ("YES" at Operation S307), the regulation controller 61 performs the adjustment control using the "adjustment pattern" that lowers the adjustment value for the phase by one step (Operation S308). Here, the "adjustment pattern" that lowers the adjustment value for the phase by one step contributes to the decrease of the amplitude in the regulator 11 at the transmitting side. Further, when it is determined that the feature of the measured eye pattern is not matching with the "fourth feature candidate" ("NO" at Operation S307), the processing flow of FIG. 14 is ended.

With the configuration as described above, even when the transmission speed is switched, "the adjustment processing" may be performed based on the measured eye pattern capable of being a predictive index of a proper correction direction in the "adjustment control." As a result, the deterioration of transmission quality may be prevented.

Third Embodiment

In Third Embodiment, in a case where the "adjustment pattern of non-adjustment" is not caused even when the "adjustment control" described in First Embodiment and Second Embodiment is performed in plural times, a mode of an equalizer is switched to a mode in which the equalizer operates as a decision feedback equalizer. Further, the transmission apparatus at the transmitting side of Third Embodiment has the same configuration as that of the transmission apparatus 10 of First Embodiment.

[Example of Configuration of a Transmission Apparatus at a Receiving Side]

Figure 15:
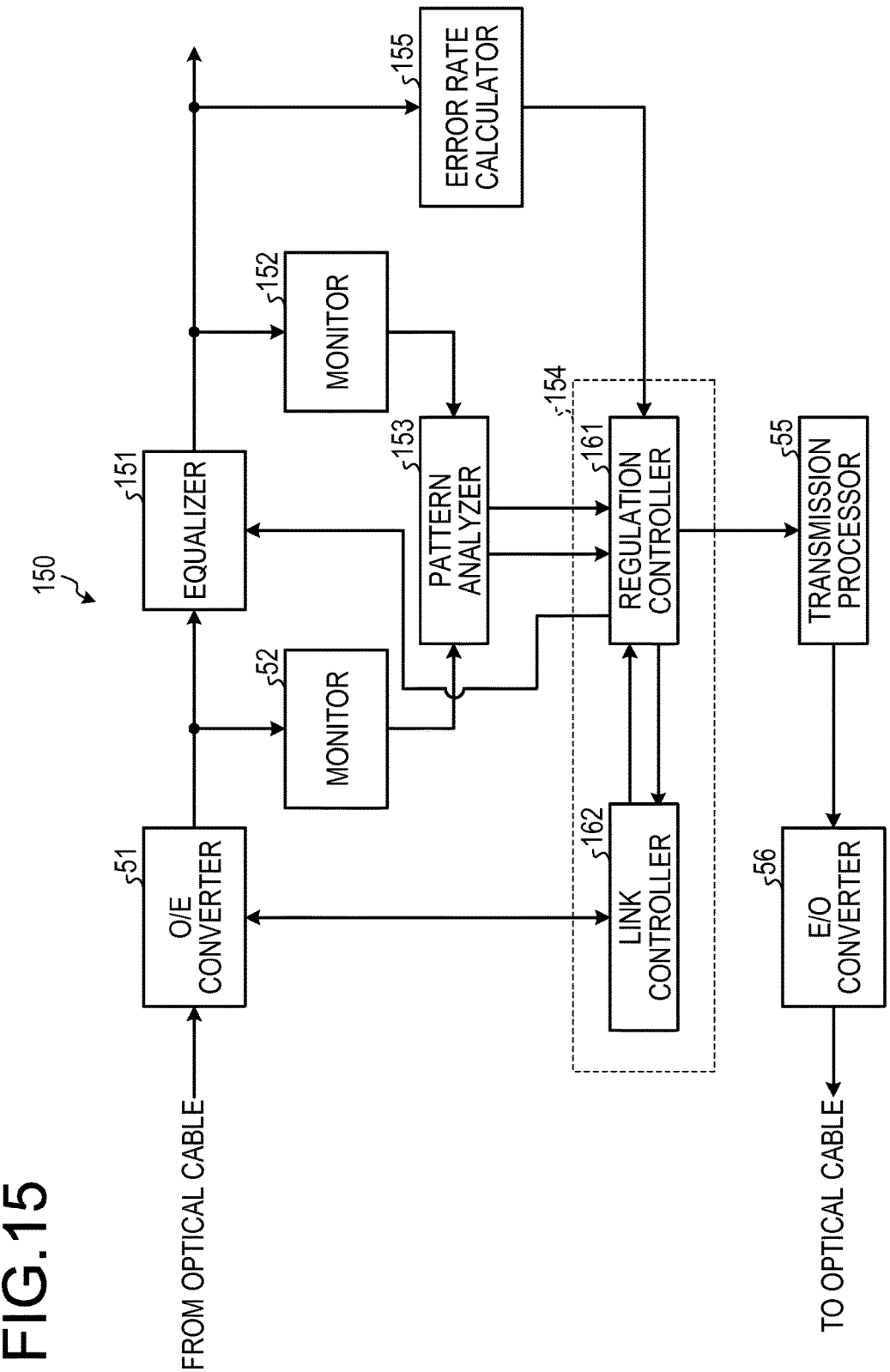
FIG. 15 is a block diagram illustrating an example of a transmission apparatus at a receiving side according to Third Embodiment.

FIG. 15 is a block diagram illustrating an example of a transmission apparatus at a receiving side according to Third Embodiment. In FIG. 15, the transmission apparatus 150 includes an equalizer 151, a monitor 152, a pattern analyzer 153, a controller 154, and an error rate calculator 155. The controller 154 includes a regulation controller 161 and a link controller 162.

The equalizer 151 adjusts the frequency characteristic of the received electrical signal being input (e.g., the high-speed differential signal) according to a "setting mode." The equalizer 151 is configured to be capable of being switched between a "first mode" as the "setting mode" at which the equalizer 151 operates as a linear equalizer and a "second mode" as the "setting mode" at which the equalizer 151 operates as a feedback equalizer.

The monitor 152 is provided at the output stage of the equalizer 151 and measures the eye pattern of the differential signal after the frequency characteristic thereof is adjusted. Further, the monitor 52 is provided at the input stage of the equalizer 151 and measures the eye pattern of the differential signal before the frequency characteristic thereof is adjusted.

The pattern analyzer 153 extracts the feature of the measured eye pattern (e.g., the first feature) measured by the monitor 52, similarly to the pattern analyzer 53 of First Embodiment. Further, the pattern analyzer 153 extracts the feature of the measured eye pattern (which may be referred to as a "second feature" in the following) measured by the monitor 152. The extraction method of the "second feature" is the same as the extraction method (e.g., an analysis method) of the "first feature" described in First Embodiment and Second Embodiment.

The regulation controller 161 repeats the "adjustment control" based on the "first feature" described in First Embodiment and Second Embodiment first until the adjustment pattern to be applied becomes the "adjustment pattern of non-adjustment" or the number of adjustment times reaches the predetermined number of times M1.

In a case where the adjustment pattern to be applied does not become the "adjustment pattern of non-adjustment" even though the regulation controller 161 repeats the "adjustment control" based on the "first feature" until the number of adjustment times reaches the predetermined number of times M1, the regulation controller 161 switches the setting mode of the equalizer 151 from the first mode to the second mode.

After the setting mode of the equalizer 151 is switched to the second mode, the regulation controller 161 repeats the "adjustment control" based on the "second feature" until the adjustment pattern to be applied becomes the "adjustment pattern of non-adjustment" or the number of adjustment times reaches the predetermined number of times M2.

In a case where the adjustment pattern to be applied does not become the "adjustment pattern of non-adjustment" even though the regulation controller 161 repeats the "adjustment control" based on the "second feature" until the number of adjustment times reaches the predetermined number of times M2, the regulation controller 161 ends the adjustment control (an abnormal end).

Further, in a case where the adjustment pattern to be applied is the "adjustment pattern of non-adjustment" in the "adjustment control" based on the "first feature" or the "adjustment control" based on the "second feature," the regulation controller 161 determines whether the error rate calculated by the error rate calculator 155 is less than a predetermined value E. When it is determined that the error rate is equal to or greater than the predetermined value E, the regulation controller 161 ends the adjustment control (an abnormal end). When it is determined that the error rate is less than the predetermined value E, the regulation controller 161 determines whether the "link state information" received from the link controller 162 indicates a state C or higher. Here, the state C indicates a state in the CPRI link in which Layer 1 synchronization has been achieved and which corresponds to the "Protocol Setup."

Also, when the "link state information" indicates that a state B or lower (e.g., lower than the state C), the regulation controller 161 causes the link controller 162 to repeat the reconnection until the link state becomes the state C or higher or the number of reconnection times reaches the predetermined value L. When the link state becomes the state C or higher, the regulation controller 161 ends the adjustment control (a normal end). Further, even in a case where the link state does not become the state C or higher even though the reconnection is repeated until the number of reconnection times reaches the predetermined value L, the regulation controller 161 ends the adjustment control (an abnormal end).

The link controller 162 performs a connection control of an optical link (the CPRI link) between the transmission apparatus 10 and the transmission apparatus 150. The link controller 162 outputs the state of CPRI link to the regulation controller 161 as the link state information.

The error rate calculator 155 calculates (measures) the error rate in communications between the transmission apparatus 10 and the transmission apparatus 150 based on the output signal of the equalizer 151.

[Example of Operations of Transmission Apparatus at Receiving Side]

Figure 16:
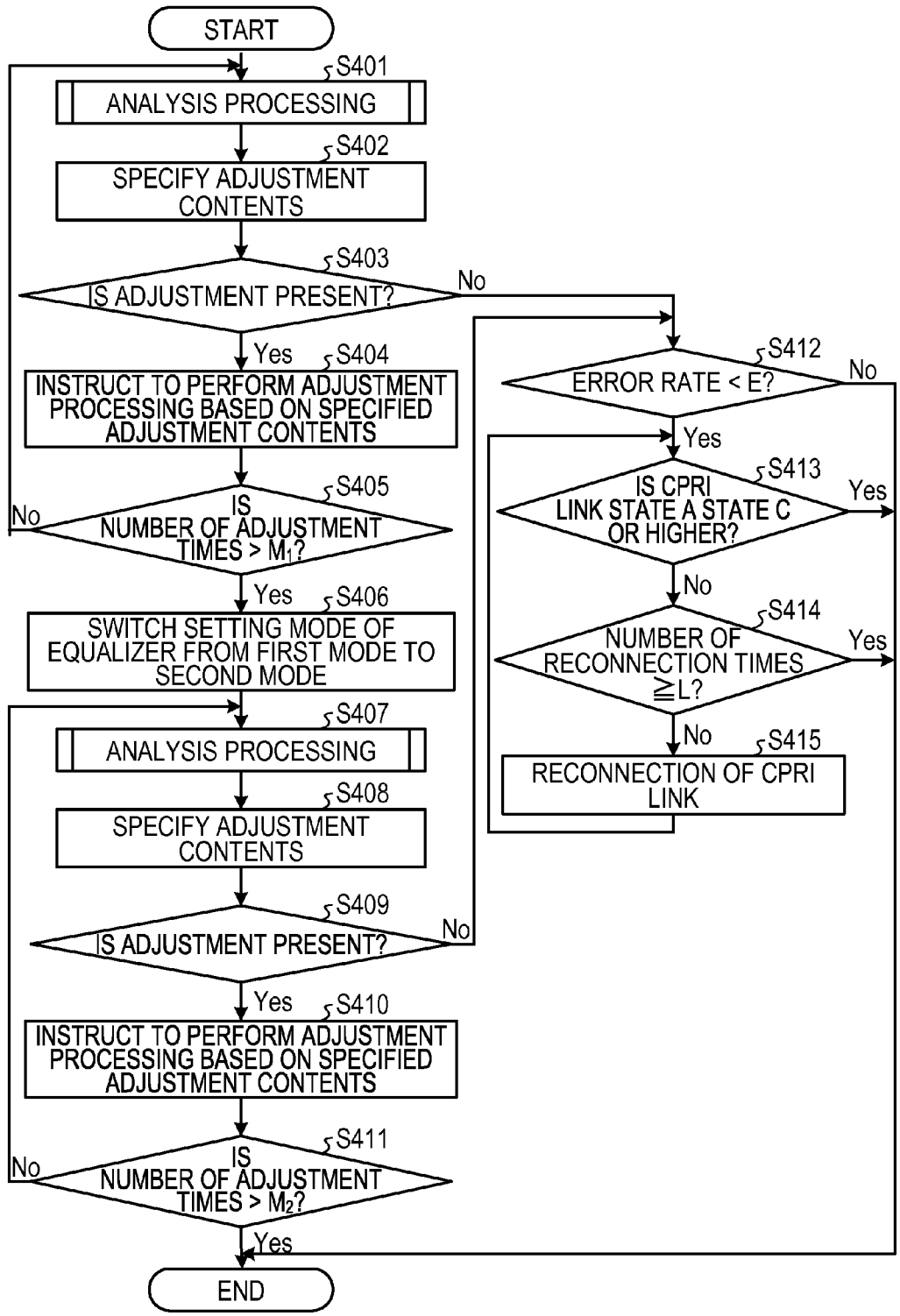
FIG. 16 is a flowchart illustrating an example of processing operations of the transmission apparatus at the receiving side according to Third Embodiment.

Descriptions will be made on an example of processing operations of the transmission apparatus 150 having the configuration as described above. FIG. 16 is a flowchart illustrating an example of processing operations of the transmission apparatus at the receiving side according to Third Embodiment.

The pattern analyzer 153 performs the analysis processing of the measured eye pattern measured by the monitor 52 (Operation S401). The analysis processing at Operation S401 is the same as the processings at Operations S102 and S103 described in FIG. 4.

The regulation controller 161 specifies adjustment contents (Operation S402). The processing at Operation S402 is the same as the processing at Operation S104 described in FIG. 4.

When it is determined that the specified adjustment pattern is the "adjustment is present" ("YES" at Operation S403), the regulation controller 161 instructs the transmission apparatus 10 at the transmitting side to perform the adjustment processing based on the specified adjustment contents (Operation S404). The processings at Operations S403 and S404 are the same as those at Operations S105 and S106 described in FIG. 4, respectively.

The regulation controller 161 determines whether the number of adjustment times reaches the predetermined number of times M1 (Operation S405). When it is determined that the number of adjustment times does not reach the predetermined number of times M1 ("NO" at Operation S405), the pattern analyzer 153 performs the analysis processing of the measured eye pattern measured by the monitor 52 at the next monitoring period (Operation S401).

When it is determined that the number of adjustment times reaches the predetermined number of times M1 ("YES" at Operation S405), the regulation controller 161 switches the setting mode of the equalizer 151 from the first mode to the second mode (Operation S406).

The pattern analyzer 153 performs the analysis processing of the measured eye pattern measured by the monitor 152 (Operation S407). The analysis processing method at Operation S407 is the same as the analysis processing at Operation S401.

The regulation controller 161 specifies the adjustment contents based on the "second feature" extracted at Operation S407 (Operation S408).

When it is determined that the specified adjustment pattern is the "adjustment is present" ("YES" at Operation S409), the regulation controller 161 instructs the transmission apparatus 10 at the transmitting side to perform the adjustment processing based on the specified adjustment contents (Operation S410). The processings at Operations S409 and S410 are the same as those at Operations S403 and S404.

The regulation controller 161 determines whether the number of adjustment times reaches the predetermined number of times M2 (Operation S411). When it is determined that the number of adjustment times does not reach the predetermined number of times M2 ("NO" at Operation S411), the pattern analyzer 153 performs the analysis processing of the measured eye pattern measured by the monitor 152 at the next monitoring period (Operation S407).

When it is determined that the number of adjustment times reaches the predetermined number of times M2 ("YES" at Operation S411), the regulation controller 161 ends the adjustment processing (an abnormal end).

When it is determined that the specified adjustment pattern is the "adjustment is none" ("NO" at Operation S403 or "NO" at Operation S409), the regulation controller 161 determines whether the error rate calculated by the error rate calculator 155 is less than the predetermined value E (Operation S412).

When it is determined that the error rate calculated by the error rate calculator 155 is less than the predetermined value E ("YES" at Operation S412), the regulation controller 161 determines whether the CPRI link state is the state C or higher (Operation S413).

When it is determined that the CPRI link state is lower than the state C ("NO" at Operation S413), the regulation controller 161 determines whether the number of reconnection times is equal to or greater than the predetermined value L (Operation S414).

When it is determined that the number of reconnection times is less than the predetermined value L ("NO" at Operation S414), the regulation controller 161 causes the link controller 162 to perform the reconnection of the CPRI link (Operation S415).

When it is determined that the error rate calculated by the error rate calculator 155 is equal to or greater than the predetermined value E ("NO" at Operation S412), the regulation controller 161 ends the adjustment processing (an abnormal end). Further, when it is determined that the CPRI link state is equal to or greater than the state C ("YES" at Operation S413), the regulation controller 161 ends the adjustment processing (a normal end). Further, when it is determined that the number of reconnection times is equal to or greater than the predetermined value L ("YES" at Operation S414), the regulation controller 161 ends the adjustment processing (an abnormal end).

As described above, according to the present embodiment, in a case where the measured eye pattern is not matching with the feature candidate corresponding to the "adjustment pattern of non-adjustment" even though the adjustment of the differential signal to be transmitted is repeated for the predetermined number of times in the transmission apparatus 150, the regulation controller 161 switches the setting mode of the equalizer 151 from the "first mode" to the "second mode." In the "first mode," the equalizer operates as a linear equalizer and in the "second mode," the equalizer operates as a decision feedback equalizer.

With the configuration of the transmission apparatus 150, even though the eye pattern is not improved by the adjustment processing in the transmission apparatus 10 at the transmitting side, the equalizer 151 may be switched to the second mode so as to improve the eye pattern in the transmission apparatus 150. Further, since the equalizer 151 may be basically set to the first mode having less power consumption and switched to the second mode at which the equalizer operates as the decision feedback equalizer when a predetermined condition is satisfied, the increase of power consumption may be reduced in the transmission apparatus 150.

Further, after the setting mode of the equalizer 151 is switched to the second mode, the regulation controller 161 causes the transmission apparatus 10 to adjust at least one of rising and falling of the differential signal to be transmitted based on the "second feature" extracted by the pattern analyzer 153.

Fourth Embodiment

Fourth Embodiment is related to triggering of the "adjustment control" described in First Embodiment to Third Embodiment. In Fourth Embodiment, especially, descriptions will be made on the "adjustment control" regarding the "uplink" from the RRH to the BBU. That is, the transmission apparatus at the transmitting side and the transmission apparatus at the receiving side described in Embodiments 1 to 3 are adapted to function as the RRH and the BBU, respectively.

[Example of Configuration of Baseband Processing Device]

Figure 17:
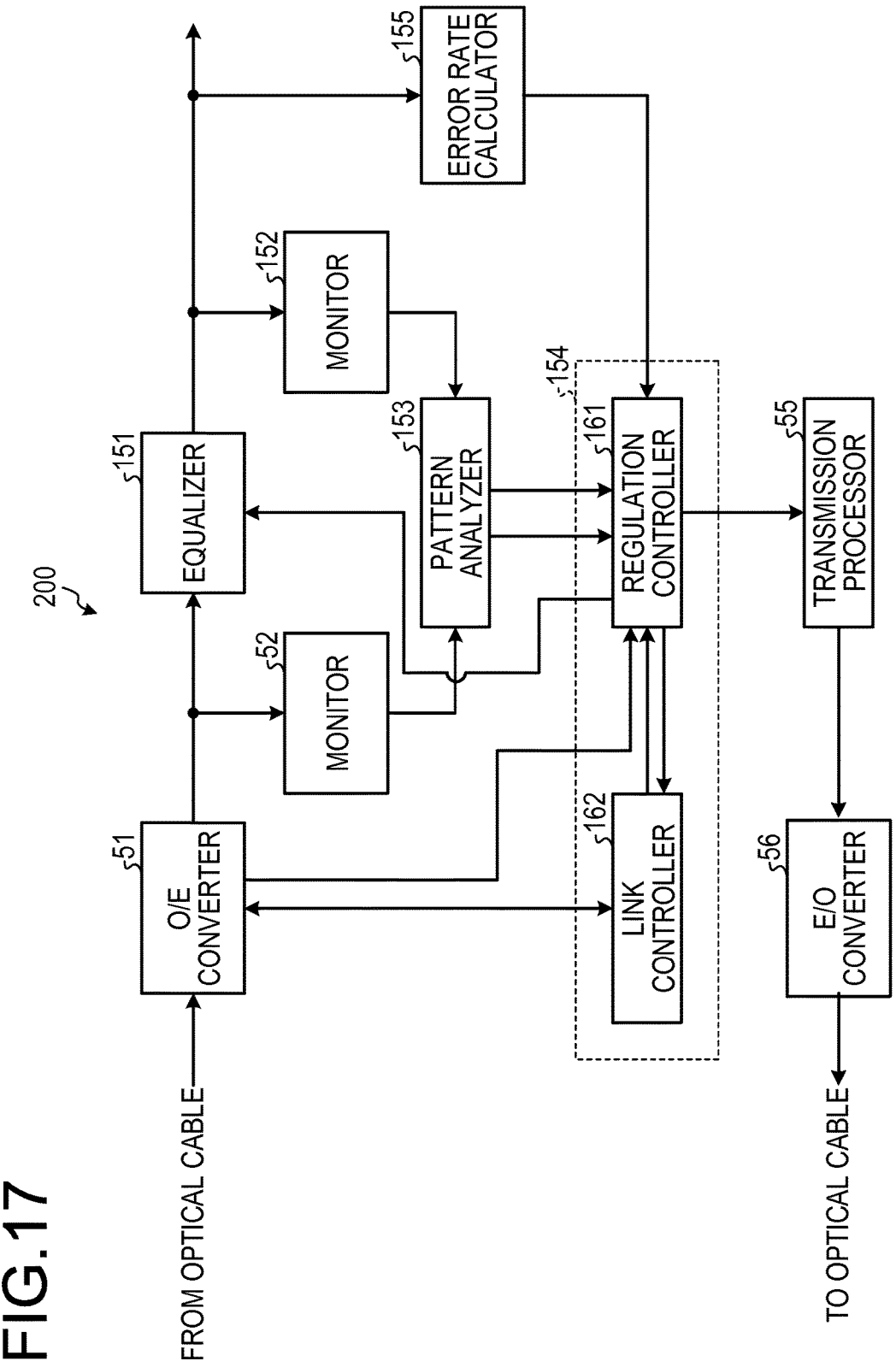
FIG. 17 is a block diagram illustrating an example of a baseband processing device according to Fourth Embodiment.

FIG. 17 is a block diagram illustrating an example of a baseband processing device according to Fourth Embodiment. An O/E converter 51 of a baseband processing device 200 illustrated in FIG. 17 extracts the temperature and the SPF (small form-factor pluggable) information of the radio processing device 300 to be described below from the received optical signal and outputs the extracted temperature and SPF information of the radio processing device 300 to a regulation controller 161. The regulation controller 161 acquires the temperature and SPF information of the radio processing device 300, the SPF information of the baseband processing device 200, the uplink error rate, and the feature of the measured eye pattern specified based on the output signal of the equalizer 151. Here, the SPF information of the radio processing device 300 is, for example, the information indicating a type of the E/O converter 12. Further, the SPF information of the baseband processing device 200 is, for example, the information indicating a type of the O/E converter 51.

Also, for example, when at least one of the first condition to the fifth condition described in the following is satisfied, the regulation controller 161 of the baseband processing device 200 performs the "adjustment control" described in First Embodiment to Third Embodiment (e.g., performs any one of the adjustment controls illustrated in FIG. 4, FIG. 14, and FIG. 16).

The "first condition" indicates that a temperature change of the radio processing device 300 to be described below is equal to or greater than a predetermined level. The "second condition" indicates that the adjustment pattern corresponding to the feature of the measured eye pattern specified by the regulation controller 161 based on the output signal of the equalizer 151 is the "adjustment is present." The "third condition" indicates that a change in the SPF (e.g., the O/E converter 51) of the baseband processing device 200 is present. The "fourth condition" indicates that a change in the SPF (e.g., the E/O converter 12) of the radio processing device 300 is present. The "fifth condition" indicates that the uplink error rate is worse than a predetermined level.

[Example of Configuration of Radio Processing Device]

Figure 18:
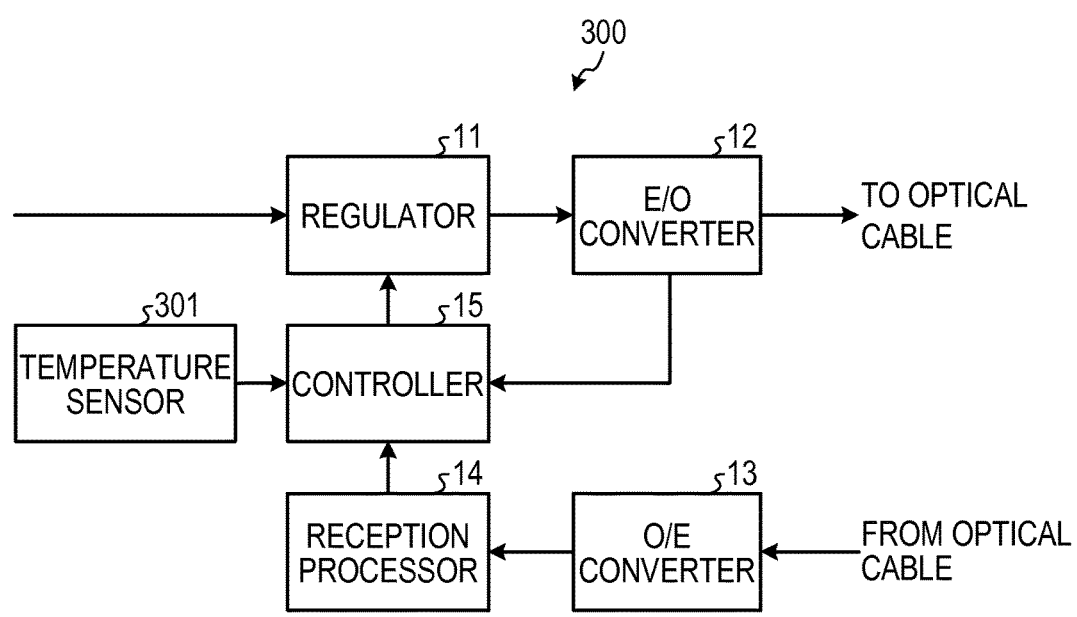
FIG. 18 is a block diagram illustrating an example of a radio processing device according to Fourth Embodiment.

FIG. 18 is a block diagram illustrating an example of a radio processing device according to Fourth Embodiment. The controller 15 of the radio processing device 300 illustrated in FIG. 18 transmits the information about the temperature measured by a temperature sensor 301 at a predetermined period and the information about the type of the E/O converter 12 to the baseband processing device 200 at a predetermined period.

[Example of Operations of Baseband Processing Device]

Figure 19:
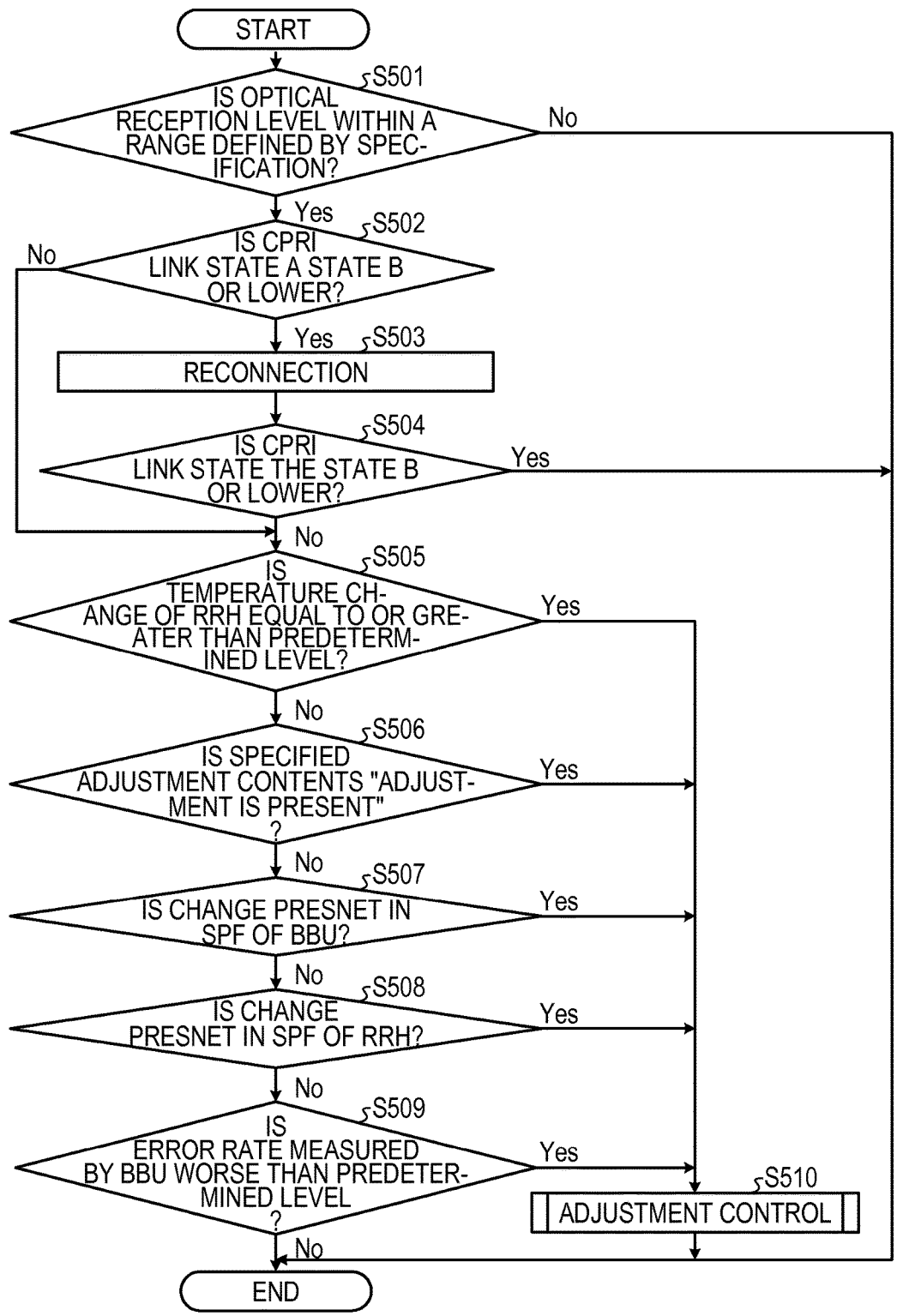
FIG. 19 is a flowchart illustrating an example of processing operations of the baseband processing device according to Fourth Embodiment.

Descriptions will be made on an example of the processing operations of the baseband processing device 200. FIG. 19 is a flowchart illustrating an example of processing operations of the baseband processing device according to Fourth Embodiment.

The regulation controller 161 determines whether an optical reception level in the O/E converter 51 falls within a range defined by the specification (that is, the CPRI) (Operation S501). When it is determined that the optical reception level does not fall within the range ("NO" at Operation S501), the processing flow of FIG. 19 is ended. Further, the processing flow of FIG. 19 may be repetitively performed at the predetermined period.

When it is determined that the optical reception level falls within the range ("YES" at Operation S501), the regulation controller 161 determines whether the CPRI link state is the state B or less (Operation S502).

When it is determined that the CPRI link state is the state B or lower ("YES" at Operation S502), the regulation controller 161 causes the link controller 162 to perform the reconnection of the CPRI link (Operation S503). When it is determined that the CPRI link state is higher than the state B ("NO" at Operation S502), the processing flow proceeds to Operation S505.

The regulation controller 161 determines again whether the CPRI link state is the state B or lower (Operation S504). When it is determined that the CPRI link state is the state B or lower ("YES" at Operation S504), the processing flow of FIG. 19 is ended.

When it is determined that the CPRI link state is higher than the state B ("NO" at Operation S504), the regulation controller 161 determines whether the temperature change of the radio processing device 300 is equal to or greater than the predetermined level (Operation S505).

When it is determined that the temperature change of the radio processing device 300 is equal to or greater than the predetermined level ("YES" at Operation S505), the regulation controller 161 performs the "adjustment control" (e.g., performs any one of the adjustment controls illustrated in FIG. 4, FIG. 14, and FIG. 16) (Operation S510).

When it is determined that the temperature change of the radio processing device 300 is less than the predetermined level ("NO" at Operation S505), the regulation controller 161 determines whether the adjustment pattern corresponding to the feature of the measured eye pattern specified based on the output signal of the equalizer 151 is the "adjustment is present" (Operation S506).

When it is determined that the adjustment pattern is the "adjustment is present" ("YES" at Operation S506), the regulation controller 161 performs the "adjustment control" (Operation S510).

When it is determined that the adjustment pattern is not the "adjustment is present" ("NO" at Operation S506), the regulation controller 161 determines whether a change in the SPF of the baseband processing device 200 is present (Operation S507).

When it is determined that a change in the SPF of the baseband processing device 200 is present ("YES" at Operation S507), the regulation controller 161 performs the "adjustment control" (Operation S510).

When it is determined that a change in the SPF of the baseband processing device 200 is absent ("NO" at Operation S507), the regulation controller 161 determines whether a change in the SPF of the radio processing device 300 is present (Operation S508).

When it is determined that a change in the SPF of the radio processing device 300 is present ("YES" at Operation S508), the regulation controller 161 performs the "adjustment control" (Operation S510).

When it is determined that a change in the SPF of the radio processing device 300 is absent ("NO" at Operation S508), the regulation controller 161 determines whether the uplink error rate is worse than the predetermined level (Operation S509).

When it is determined that the uplink error rate is worse than the predetermined level ("YES" at Operation S509), the regulation controller 161 performs the "adjustment control" (Operation S510). When it is determined that the uplink error rate is good to be equal to or greater than the predetermined level ("NO" at Operation S509), the processing flow of FIG. 19 is ended.

As described above, according to the present embodiment, the regulation controller 161 performs the "adjustment control" in the baseband processing device 200 when any one of the first condition to the fifth condition is satisfied.

With the configuration of the baseband processing device 200, it is possible to surely perform the adjustment processing in a case where a possibility of an occurrence of change in the feature of the eye pattern in the uplink is high.

Fifth Embodiment

Fifth Embodiment is related to triggering of the "adjustment control" described in Embodiments 1 to 3. In Fifth Embodiment, especially, descriptions will be made on the adjustment control regarding the "downlink" from the BBU to the RRH. That is, the transmission apparatus at the transmitting side and the transmission apparatus at the receiving side described in Embodiments 1 to 3 are adapted as the BBU and the RRH, respectively.

[Example of Configuration of Radio Processing Device]

Figure 20:
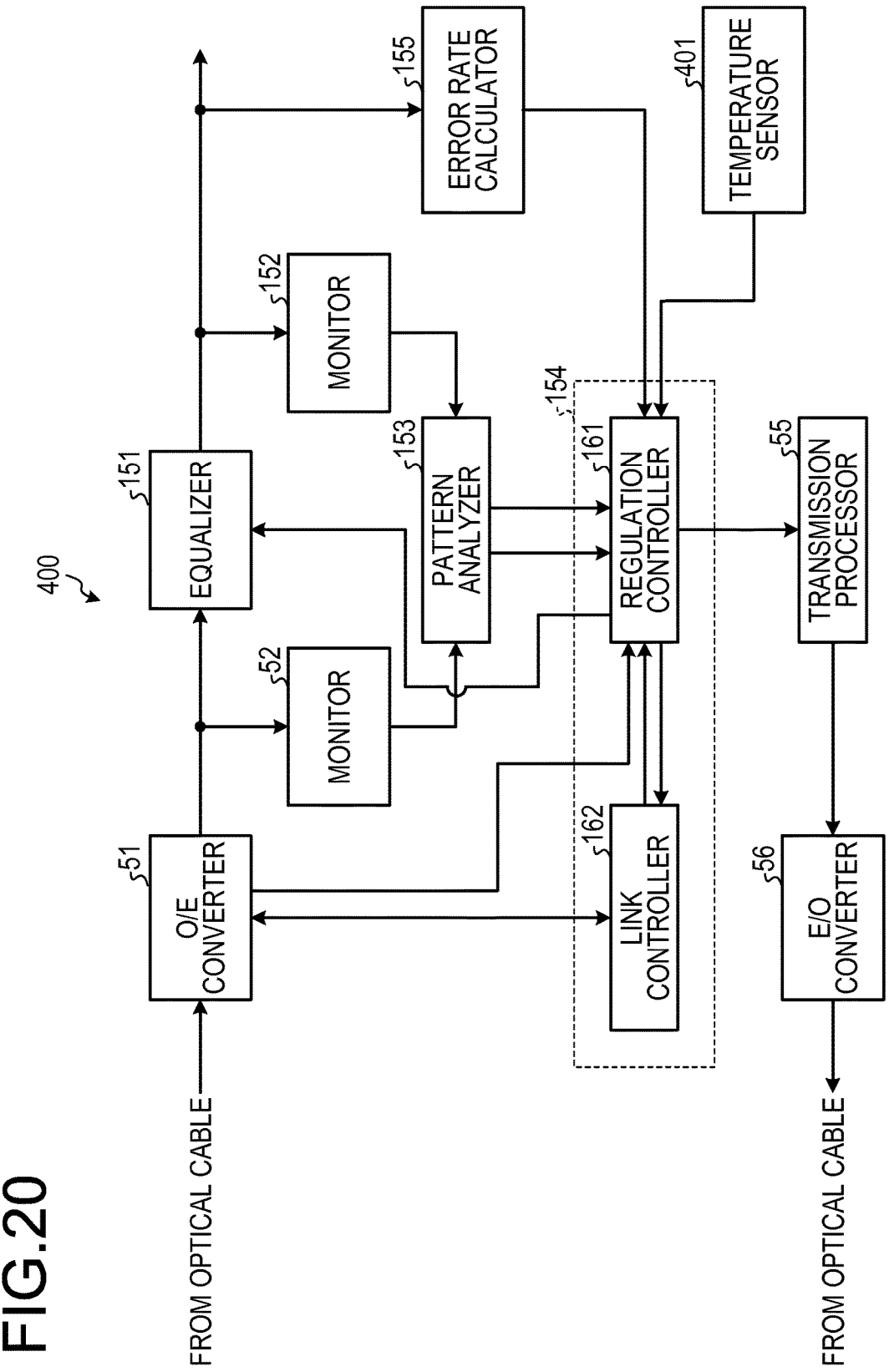
FIG. 20 is a block diagram illustrating an example of a radio processing device according to Fifth Embodiment.

FIG. 20 is a block diagram illustrating an example of a radio processing device according to Fifth Embodiment. The O/E converter 51 of the radio processing device 400 illustrated in FIG. 20 extracts the SPF (Small form-factor pluggable) information of the baseband processing device 500 to be described below from the received optical signal and outputs the extracted SPF information of the baseband processing device 500 to the regulation controller 161. The regulation controller 161 acquires the SPF information of the baseband processing device 500, the temperature and the SPF information measured by the temperature sensor 401 of the radio processing device 400, the downlink error rate, and the feature of the measured eye pattern specified based on the output signal of the equalizer 151. Here, the SPF information of the radio processing device 400 is, for example, the information indicating a type of the O/E converter 51. Further, the SPF information of the baseband processing device 500 as described below is, for example, the information indicating a type of the E/O converter 12.

Also, for example, when at least one of the first condition to the fifth condition described in the following is satisfied, the regulation controller 161 of the radio processing device 400 performs the "adjustment control" described in First Embodiment to Third Embodiment (e.g., performs any one of the adjustment controls illustrated in FIG. 4, FIG. 14, and FIG. 16).

The "first condition" indicates that a temperature change of the radio processing device 400 is equal to or greater than the predetermined level. The "second condition" indicates that the adjustment pattern corresponding to the feature of the measured eye pattern specified by the regulation controller 161 based on the output signal of the equalizer 151 is the "adjustment is present." The "third condition" indicates that a change in the SPF (e.g., the E/O converter 12) of the baseband processing device 500 is present. The "fourth condition" indicates that a change in the SPF (e.g., the O/E converter 51) of the radio processing device 400 is present. The "fifth condition" indicates that the downlink error rate is worse than a predetermined level.

[Example of Configuration of Baseband Processing Device]

Figure 21:
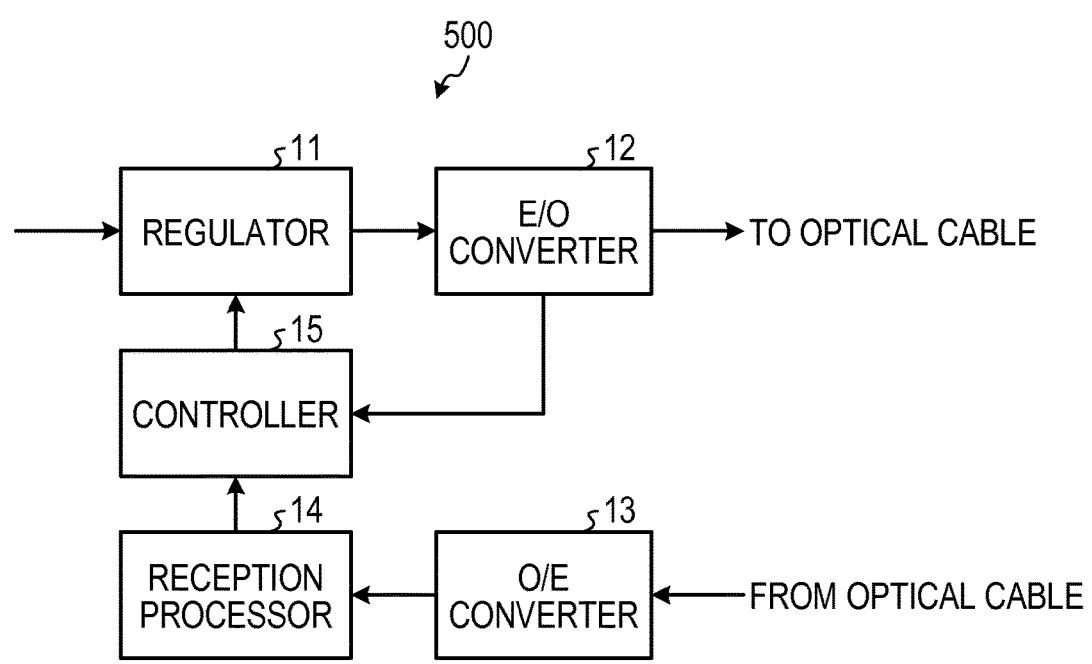
FIG. 21 is a block diagram illustrating an example of a baseband processing device according to Fifth Embodiment.

FIG. 21 is a block diagram illustrating an example of a baseband processing device according to Fifth Embodiment. A controller 15 of a baseband processing device 500 illustrated in FIG. 21 transmits the information about the type of the E/O converter 12 to the radio processing device 400 at a predetermined period.

[Example of Operations of Radio Processing Device]

Figure 22:
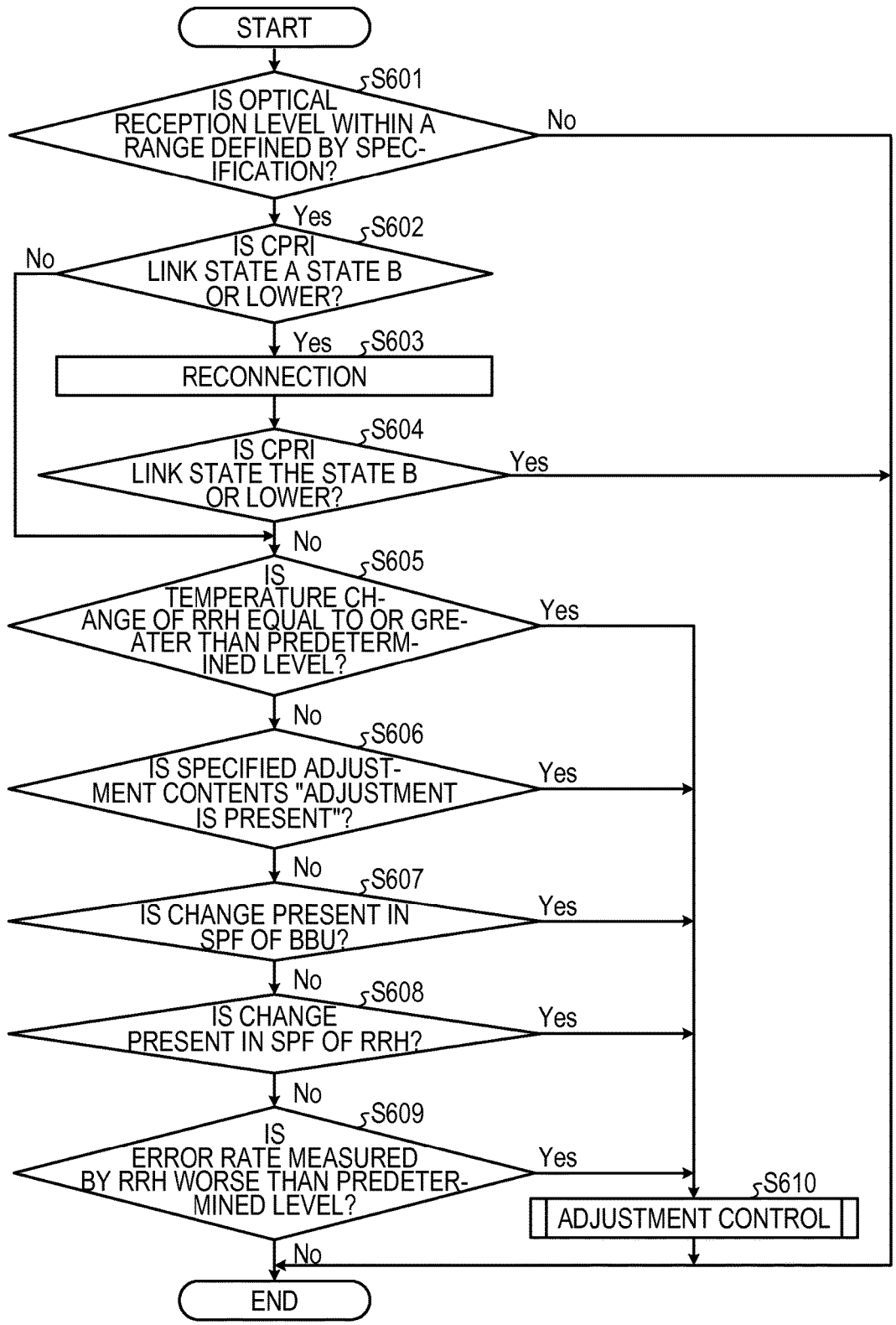
FIG. 22 is a flowchart illustrating an example of processing operations of the radio processing device according to Fifth Embodiment.

Descriptions will be made on an example of the processing operations of the radio processing device 400. FIG. 22 is a flowchart illustrating an example of processing operations of the radio processing device according to Fifth Embodiment.

The regulation controller 161 of the radio processing device 400 determines whether the optical reception level in the O/E converter 51 falls within a range defined by the specification (that is, the CPRI) (Operation S601). When it is determined that the optical reception level does not fall within the range ("NO" at Operation S601), the processing flow of FIG. 22 is ended. Further, the processing flow of FIG. 22 may be repetitively performed at the predetermined period.

When it is determined that the optical reception level falls within the range ("YES" at Operation S601), the regulation controller 161 determines whether the CPRI link state is the state B or lower (Operation S602).

When it is determined that the CPRI link state is the state B or lower ("YES" at Operation S602), the regulation controller 161 causes the link controller 162 to perform the reconnection of the CPRI link (Operation S603). When it is determined that the CPRI link state is higher than the state B ("NO" at Operation S602), the processing flow proceeds to Operation S605.

The regulation controller 161 determines again whether the CPRI link state is the state B or lower (Operation S604). When it is determined that the CPRI link state is the state B or lower ("YES" at Operation S604), the processing flow of FIG. 22 is ended.

When it is determined that the CPRI link state is higher than the state B ("NO" at Operation S604), the regulation controller 161 determines whether the temperature change of the radio processing device 400 is equal to or greater than the predetermined level (Operation S605).

When it is determined that the temperature change of the radio processing device 400 is equal to or greater than the predetermined level ("YES" at Operation S605), the regulation controller 161 performs the "adjustment control" (that is, any one of the adjustment controls illustrated in FIG. 4, FIG. 14, and FIG. 16) (Operation S610).

When it is determined that the temperature change of the radio processing device 400 is less than the predetermined level ("NO" at Operation S605), the regulation controller 161 determines whether the adjustment pattern corresponding to the feature of the measured eye pattern specified by the regulation controller 161 based on the output signal of the equalizer 151 is the "adjustment is present" (Operation S606).

When it is determined that the adjustment pattern is the "adjustment is present" ("YES" at Operation S606), the regulation controller 161 performs the "adjustment control" (Operation S610).

When it is determined that the adjustment pattern is not the "adjustment is present" ("NO" at Operation S606), the regulation controller 161 determines whether a change in the SPF of the baseband processing device 500 is present (Operation S607).

When it is determined that a change in the SPF of the baseband processing device 500 is present ("YES" at Operation S607), the regulation controller 161 performs the "adjustment control" (Operation S610).

When it is determined that a change in the SPF of the baseband processing device 500 is absent ("NO" at Operation S607), the regulation controller 161 determines whether a change in the SPF of the radio processing device 400 is present (Operation S608).

When it is determined that a change in the SPF of the radio processing device 400 is present ("YES" at Operation S608), the regulation controller 161 performs the "adjustment control" (Operation S610).

When it is determined that a change in the SPF of the radio processing device 400 is absent ("NO" at Operation S608), the regulation controller 161 determines whether the downlink error rate is worse than a predetermined level (Operation S609).

When it is determined that the downlink error rate is worse than the predetermined level ("YES" at Operation S609), the regulation controller 161 performs the "adjustment control" (Operation S610). When it is determined that the downlink error rate is good to be equal to or higher than the predetermined level ("NO" at Operation S609), the processing flow of FIG. 22 is ended.

As described above, according to the present embodiment, the regulation controller 161 performs the "adjustment control" in the radio processing device 400 when any one of the first condition to the fifth condition is satisfied.

With the configuration of the radio processing device 400, it is possible to surely perform the adjustment processing in a case where a possibility of an occurrence of change in the feature of the eye pattern in the downlink is high.

Other Embodiments

[1] The transmission apparatus at the receiving side autonomously performs the adjustment control in First Embodiment to Fifth Embodiment, but the present disclosure is not limited thereto. For example, the transmission apparatus at the receiving side may inquire an upper layer apparatus (e.g., a network controller) directly or through the transmission apparatus at the transmitting side of whether it is allowed to perform the adjustment processing, and perform the adjustment processing when a permission to perform the adjustment processing is obtained from the upper layer apparatus.

[2] It is not necessary that elements of the units or parts illustrated in First Embodiment to Fifth Embodiment are required to be configured physically as illustrated in the figures. In other words, detailed forms of distribution and integration of the illustrated units or parts are not limited to those illustrated in the figures, but some or all of which may be functionally or physically distributed or integrated in any units depending on various loads and use situations.

Further, various processing functions performed by each of devices may be entirely or partially performed on the CPU (Central Processing Unit) (or a microcomputer such as, for example, an MPU (Micro Processing Unit) or an MCU (Micro Controller Unit)). It should be understood that the various processing functions may be entirely or partially performed on programs parsed and executed by the CPU (or the microcomputer such as the MPU or the MCU) or on a hardware by wired logic.

The transmission apparatus of Embodiments 1 to 5 may be implemented by, for example, the hardware configuration as described below.

Figure 23:
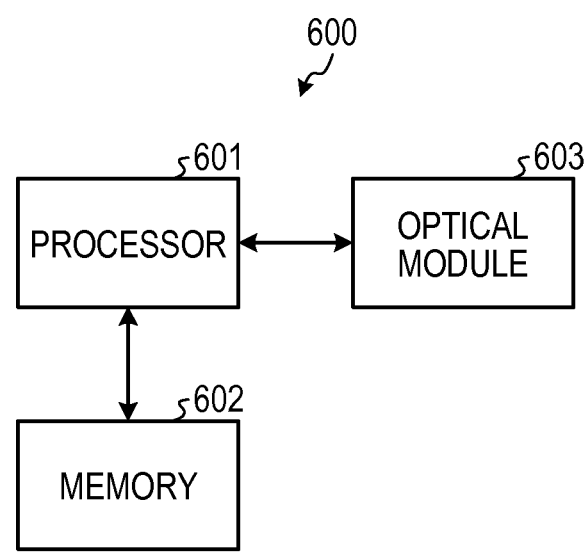
FIG. 23 is a diagram illustrating an example of a hardware configuration of a transmission apparatus.

FIG. 23 is a diagram illustrating an example of a hardware configuration of a transmission apparatus. As illustrated in FIG. 23, the transmission apparatus 600 includes a processor 601, a memory 602, and an optical module 603. Each of the transmission apparatuses 10, 50, and 150 of Embodiments 1 to 5 has a hardware configuration illustrated in FIG. 23. The processor 601 may be, for example, a CPU (Central Processing Unit), a DSP (Digital Signal Processor), and an FPGA (Field Programmable Gate Array). Further, the memory 602 may be, for example, an RAM (Random Access Memory) such as an SDRAM (Synchronous Dynamic Random Access Memory), an ROM (Read Only Memory), and a flash memory.

Also, various processing functions performed in the transmission apparatus of First Embodiment to Fifth Embodiment may be implemented by executing programs stored in various memories such as a non-volatile storage medium by the processor. That is, the programs corresponding to the processings performed by the regulator 11, the reception processor 14, and the controller 15 are stored in the memory 602 and the programs may be executed by the processor 601. Further, the programs corresponding to the processings performed according to the monitors 52 and 152, the pattern analyzers 53 and 153, the controllers 54 and 154, the transmission processor 55, the equalizer 151, and the error rate calculator 155 are stored in the memory 602 and the programs may be executed by the processor 601. The E/O converters 12 and 56, and the O/E converters 13 and 51 are implemented by the optical module 603.

Further, here, although various processing functions performed in the transmission apparatus of First Embodiment to Fifth Embodiment are performed by a single processor 601, the present disclosure is not limited thereto and may be performed by a plurality of processors.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus of a receiving side to receive a signal transmitted from a transmission apparatus of a transmitting side, the transmission apparatus of the receiving side comprising:
   a first monitor configured to measure an eye pattern indicating a signal waveform transition of the signal transmitted from the transmission apparatus of the transmitting side;
   a pattern analyzer configured to extract a first feature of the eye pattern measured by the first monitor; and
   a regulation controller configured to cause the transmission apparatus of the transmitting side to adjust at least one of rising and falling of a signal to be transmitted, based on the first feature extracted by the pattern analyzer,
   wherein the pattern analyzer is further configured to specify a feature candidate matching with the eye pattern measured by the first monitor as the first feature among a plurality of feature candidates.

2. The transmission apparatus according to claim 1, wherein the regulation controller is configured to specify an adjustment pattern to be applied, based on the feature candidate specified by the pattern analyzer and a correspondence relationship between the plurality of feature candidates and adjustment patterns based on to the respective feature candidates.

3. The transmission apparatus according to claim 2, further comprising:

an equalizer configured to adjust a frequency characteristic of the signal according to a setting mode that is to be switched between a first mode at which the equalizer operates as a linear equalizer and a second mode at which the equalizer operates as a decision feedback equalizer, wherein the first monitor is provided at an input stage of the equalizer to measure the eye pattern of the signal input to the equalizer, and wherein the regulation controller is configured to switch the setting mode of the equalizer from the first mode to the second mode when the eye pattern measured by the first monitor is not matching with the feature candidate corresponding to the adjustment pattern of adjustment-free even though the adjustment, by the regulation controller, for the signal to be transmitted is repeated for a predetermined number of times.

4. The transmission apparatus according to claim 3, further comprising:

a second monitor provided at an output stage of the equalizer and configured to measure the eye pattern of the signal for which the frequency characteristic thereof is adjusted by the equalizer, wherein the pattern analyzer is configured to extract a second feature of the eye pattern measured by the second monitor, and wherein the regulation controller is configured to cause the transmission apparatus of the transmitting side to adjust at least one of rising and falling of the signal to be transmitted, based on the extracted second feature, after the setting mode of the equalizer is switched to the second mode.

5. The transmission apparatus according to claim 1, wherein the signal comprises a differential signal.

6. The transmission apparatus according to claim 1, wherein the regulator controller is further configured to perform an adjustment control using an adjustment pattern configured to:

raise an adjustment value for phase so as to increase an amplitude in a regulator at the transmission side; or lower the adjustment value for phase so as to decrease the amplitude in the regulator at the transmission side.

7. The transmission apparatus according to claim 1, wherein the regulator controller is further configured to perform an adjustment control using an adjustment pattern configured to lower an adjustment value for amplitude in a regulator.

8. The transmission apparatus according to claim 1, wherein the regulator controller is further configured to perform an adjustment control when:

(a) a temperature change of a radio processing device is equal to or greater than a first predetermined level;

(b) the adjustment pattern, which corresponds to a feature of the measured eye pattern specified by the regulation controller, indicates that an adjustment is present;

(c) a change in small-form-factor pluggable information of a baseband processing device or a radio processing device is present; or (d) a downlink error rate is lower than a second predetermined level.

* * * * *